US012674437B2

(12) United States Patent
    Gehring

(10) Patent No.: US 12,674,437 B2
(45) Date of Patent: Jul. 7, 2026

(54) WIND TURBINE TOWER ELEVATOR WITH TOWER BELT

(71) Applicant: Donald Hollis Gehring, Houston, TX (US)

(72) Inventor: Donald Hollis Gehring, Houston, TX (US)

( * ) Notice: Subject to any disclaimer, the term of this patent is extended or adjusted under 35 U.S.C. 154(b) by 0 days.

(21) Appl. No.: 19/022,786

(22) Filed: Jan. 15, 2025

(65) Prior Publication Data

US 2025/0154935 A1     May 15, 2025

Related U.S. Application Data

(63) Continuation-in-part of application No. 18/828,937, filed on Sep. 9, 2024, now Pat. No. 12,246,949.

(60) Provisional application No. 63/537,901, filed on Sep. 12, 2023.

(51) Int. Cl.
    *F03D 80/00* (2016.01)
    *B66B 9/00* (2006.01)

(52) U.S. Cl.
    CPC .............. *F03D 80/001* (2023.08); *B66B 9/00* (2013.01)

(58) Field of Classification Search
    CPC ..... E04H 12/342; B66C 23/185; F03D 13/20; F03D 80/001; B66B 9/00
    See application file for complete search history.

(56) References Cited

U.S. PATENT DOCUMENTS

| | | | | |
|---|---|---|---|---|
| 6,357,549 B1 * | 3/2002 | Brennan | ............... | B66C 23/207 |
| | | | | 182/103 |
| 6,505,785 B2 * | 1/2003 | Willis | ..................... | F03D 13/20 |
| | | | | 182/103 |
| 6,614,125 B2 * | 9/2003 | Willis | ..................... | F03D 13/40 |
| | | | | 290/55 |
| 7,442,009 B2 * | 10/2008 | Arel | ........................ | F03D 80/70 |
| | | | | 416/142 |
| 8,353,141 B2 * | 1/2013 | Berg | ................... | E02B 17/0818 |
| | | | | 52/114 |
| 2016/0369778 A1 * | 12/2016 | Davis | .................... | E04H 12/342 |

FOREIGN PATENT DOCUMENTS

| | | | | |
|---|---|---|---|---|
| CN | 114104999 A | * | 3/2022 | ............. F03D 13/10 |
| DE | 19741988 A1 | * | 4/1999 | ........... E04H 12/342 |
| EP | 2246561 A2 | * | 11/2010 | ............. F03D 13/20 |

* cited by examiner

*Primary Examiner* — Diem M Tran

(57)     ABSTRACT

A wind turbine tower elevator with tower belt includes a first tower rail, a second tower rail, an elevator, a first jacking system, a second jacking system, a first locking system, a second locking system, and a multi-section belt. The first tower rail and the second tower rail guide the movement of the elevator along a wind turbine tower. The elevator facilitates the transportation of turbine blades and the nacelle. The elevator also retains the first jacking system, the second jacking system, the first locking system, and the second locking system. The first jacking system and the second jacking system enable the movement of the elevator along the wind turbine tower. The first locking system and the second locking system secure the elevator in place at the desired location along the wind turbine tower. The multi-section belt secures the elevator to the wind turbine tower and guides the elevator movement.

16 Claims, 32 Drawing Sheets

WIND TURBINE TOWER ELEVATOR WITH TOWER BELT

The current application is a continuation-in-part (CIP) application of a U.S. non-provisional application Ser. No. 18/828,937 filed on Sep. 9, 2024. The U.S. non-provisional application Ser. No. 18/828,937 claims a priority to a U.S. provisional application Ser. No. 63/537,901 filed on Sep. 12, 2023.

FIELD OF THE INVENTION

The present invention relates generally to renewable power generation. More specifically, the present invention is an elevator system that is mounted to the wind turbine tower to easily install and maintain the nacelle, turbine blades, and elevated components of the wind turbine tower.

BACKGROUND OF THE INVENTION

As technology and industry in the modern world continues to grow and expand, so do the power requirements. Many different sources of power generation exist today involving fossil fuel burning, solar, wind, geothermal, hydroelectric, wave and current power generation, etc. Wind turbines serve as a renewable energy source that converts the kinetic energy of wind into electrical energy. Wind turbines are generally installed as a wind farm to generate a large amount of power and are an increasingly important source of intermittent renewable energy. Many countries use wind turbines to lower energy costs and reduce reliance on fossil fuels.

Wind turbines are manufactured in a wide range of sizes, with either horizontal or vertical axes, though horizontal is most common. Generally, a tower is built and then the wind turbine nacelle with the blades are lifted onto the tower using high lift capacity long boom crane. The assembly process of a wind turbine is expensive due to the operating charges of the high lift capacity long boom cranes. Further, when major repairs are needed, the high lift capacity long boom cranes are utilized to disassemble the nacelle or the blades, accumulating additional expenses. Furthermore, the high elevation of the wind turbines also creates challenging and hazardous environments for assembly crews and maintenance crews.

Therefore, an objective of the present invention is to disclose a wind turbine tower elevator with tower belt that facilitates the installation and maintenance of the nacelle, the blades, and other elevated components without the need for a high lift capacity long boom crane. The present invention also provides various safety features that allows the transportation of the assembly crews and the maintenance crews. As a result, the present invention can lower the capital expenses and operational expenses of the wind turbines and creates a safer working environment for the assembly crews and maintenance crews. Further, the present invention can be used for floating wind turbine towers without the need for high-capacity long boom cranes that consequently provides significant savings in terms of time and money. The present invention can also operationally mount the standard wind towers and the telescopic wind towers without deviating from the scope of the functionality. Additional features and benefits of the present invention are further discussed in the sections below.

DETAILED DESCRIPTION OF THE INVENTION

Figure 1:
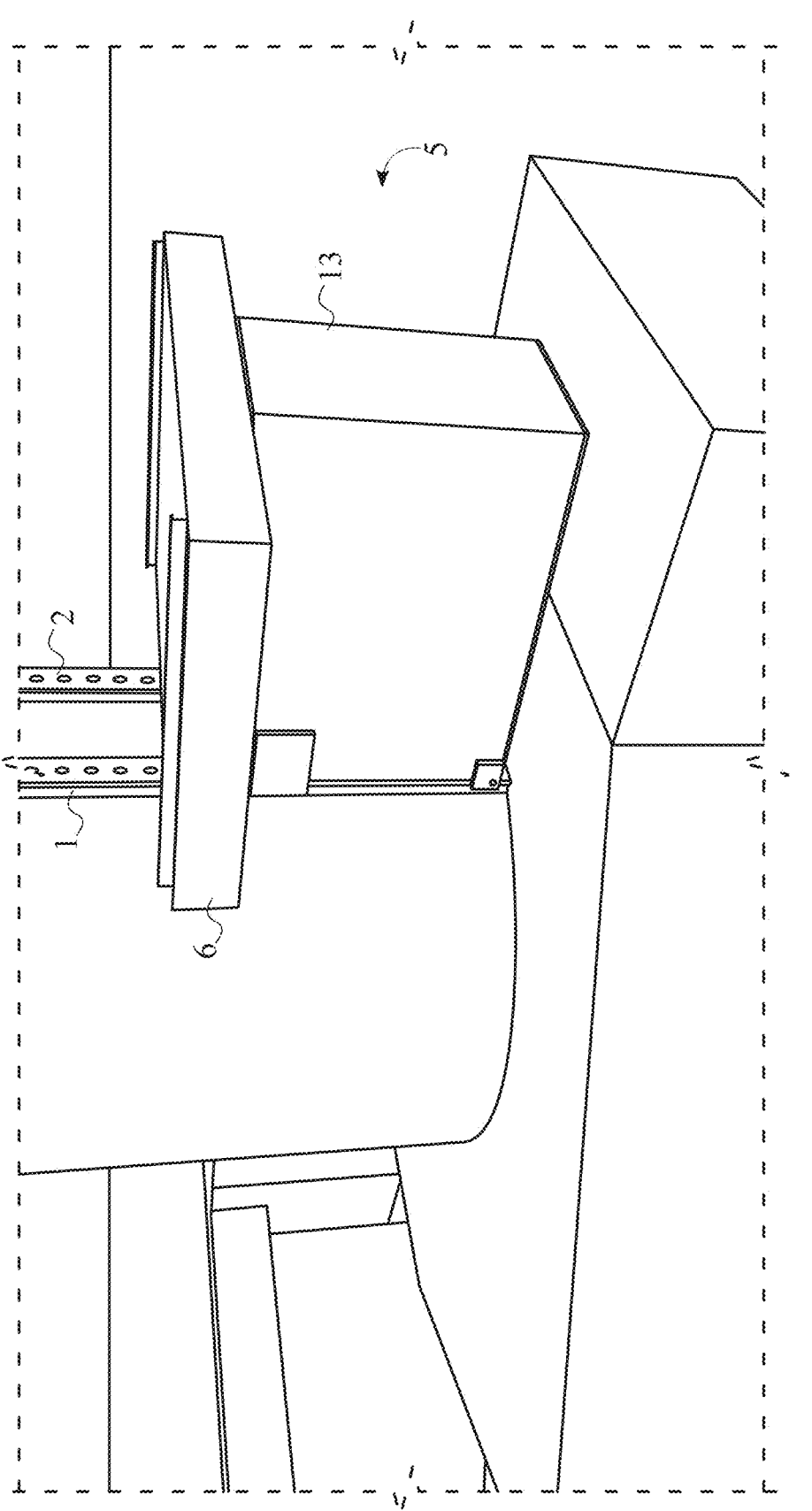
FIG. 1 is a schematic view of the present invention, wherein the present invention is connected to the wind turbine tower.
Figure 2:
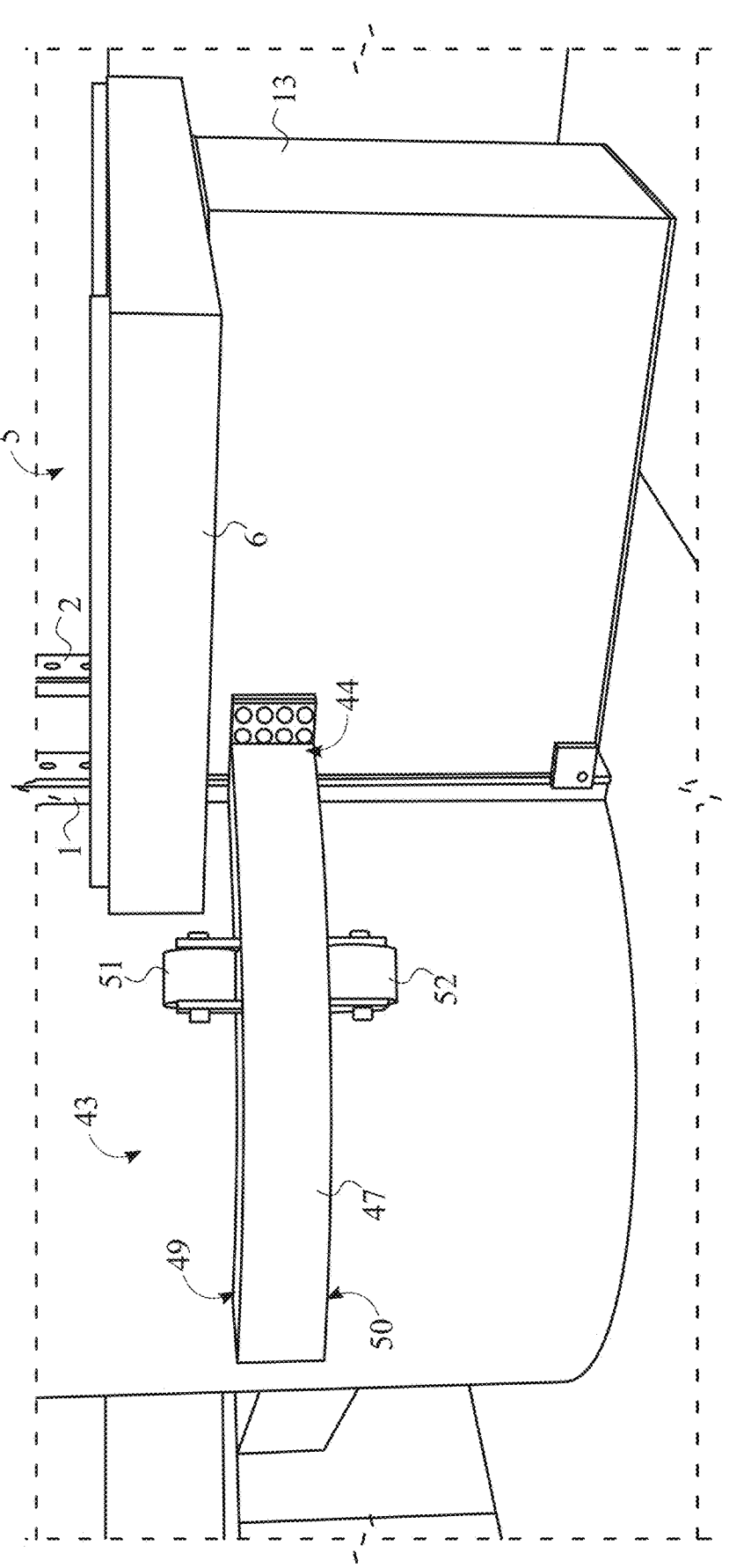
FIG. 2 is a schematic view of the present invention, wherein the multi-section belt is shown assembled, and wherein the first quarter belt section of the multi-section belt is connected to the enclosure.
Figure 3:
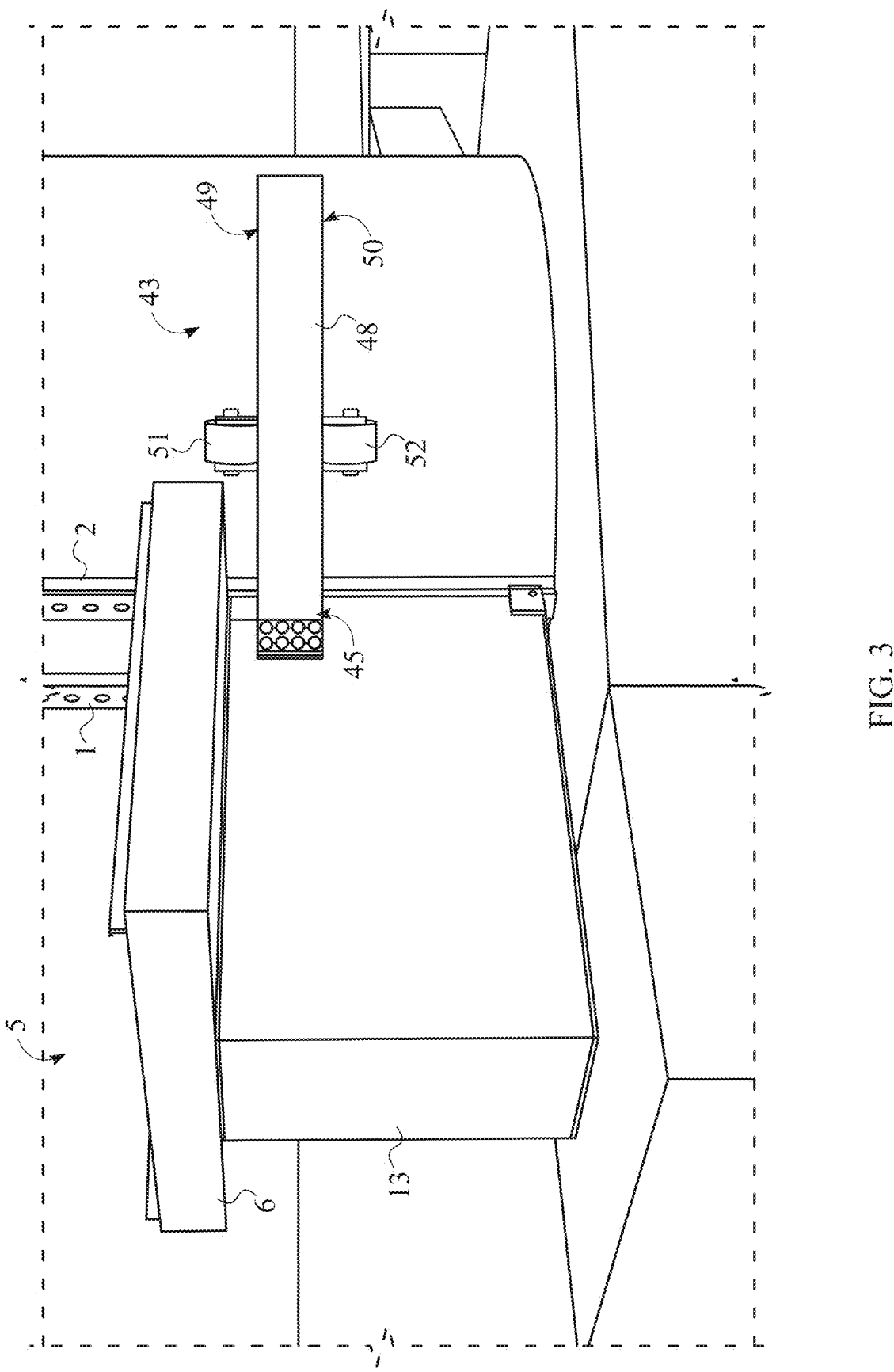
FIG. 3 is a schematic view of the present invention, wherein the multi-section belt is shown assembled, and wherein the second quarter belt section of the multi-section belt is connected to the enclosure.
Figure 4:
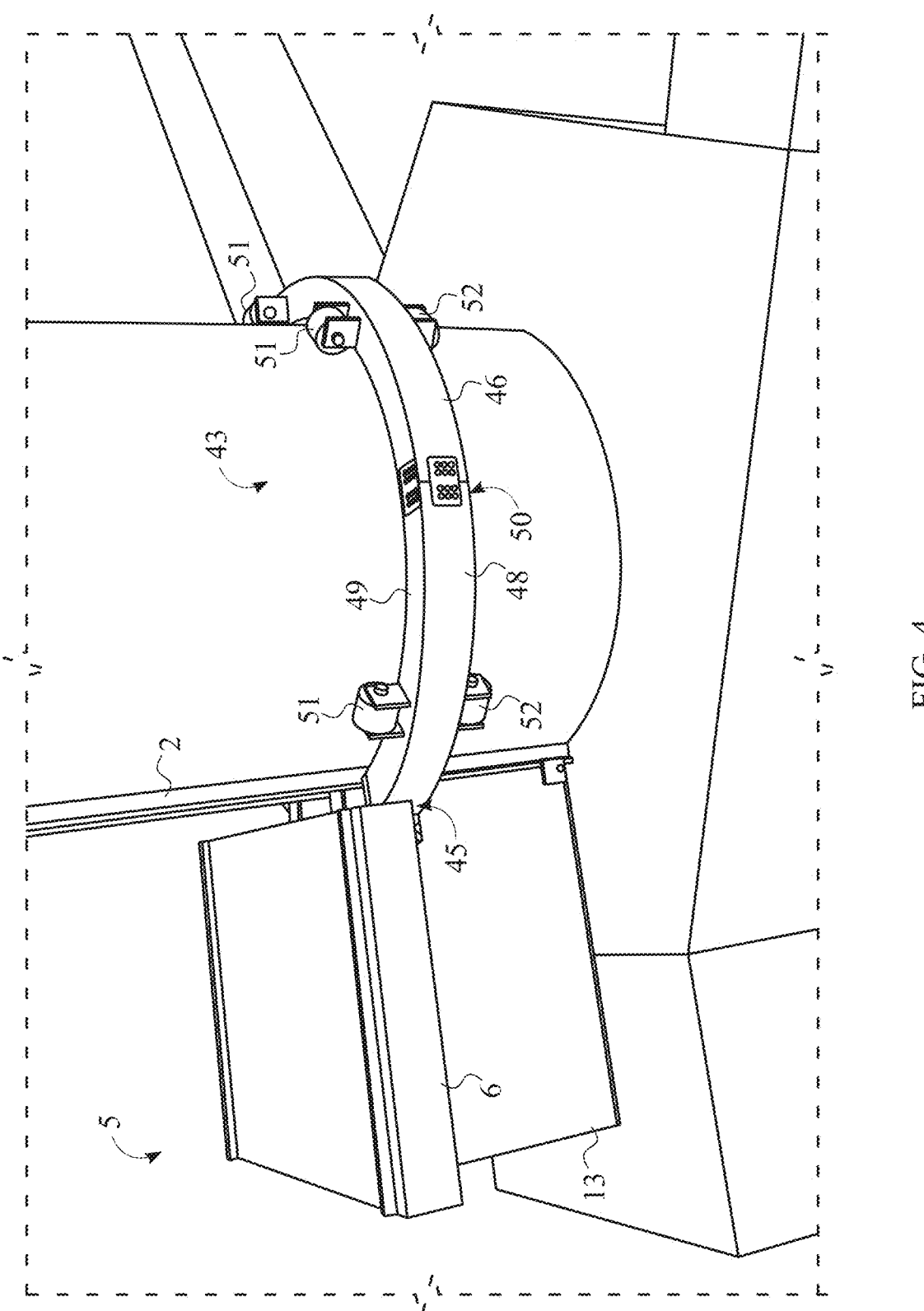
FIG. 4 is a schematic view of the present invention, wherein the multi-section belt is shown assembled, and wherein the half belt section of the multi-section belt is connected to the first quarter belt section and the second quarter belt section.

All illustrations of the drawings are for the purpose of describing selected versions of the present invention and are not intended to limit the scope of the present invention.

The present invention discloses a wind turbine tower elevator with tower belt that enables the installation and maintenance of a nacelle, the blades, and other elevated components without the need for a high lift capacity long boom crane. The present invention allows the nacelle, the blades, and other elevated components to be lifted or lowered and allows the maintenance/assembly crews to easily access the corresponding parts of the wind turbine without the use of the high lift capacity long boom cranes. As a result, the present invention can lower the capital expenditure and operational costs that are generally associated with a wind turbine.

As shown in FIGS. 1 through 17, the present invention comprises a first tower rail 1, a second tower rail 2, an elevator 5, a first jacking system 17, a second jacking system 18, a first locking system 27, a second locking system 28, and a multi-section belt 43. In reference to the general configuration, the first tower rail 1 and the second tower rail 2 are mounted onto the wind turbine tower and positioned parallel and offset to each other. The elevator 5 transports the nacelle, the blades, and other elevated components along the first tower rail 1 and the second tower rail 2. More specifically, the elevator 5 comprises a main platform 6 and an enclosure 13 as the main platform 6 is connected onto the enclosure 13. The main platform 6 and the enclosure 13 are positioned adjacent to the first tower rail 1 and the second tower rail 2 thus allowing the elevator 5 to move upward and downward along the first tower rail 1 and the second tower rail 2. The first jacking system 17, the second jacking system 18, the first locking system 27, and the second locking system 28 are integrated into the enclosure 13 so that the directional movement of the elevator 5 can be controlled. More specifically, the enclosure 13 is slidably mounted to the first tower rail 1 by the first jacking system 17 and the first locking system 27 thus operationally securing one side of the elevator 5 to the wind turbine tower. Similarly, the enclosure 13 is slidably mounted to the second tower rail 2 by the second jacking system 18 and the second locking system 28 thus operational securing the opposite side of the elevator 5 to the wind turbine tower. The first jacking system 17 and the second jacking system 18 is preferably a pin-in-the-hole jacking system but can alternatively be a rack and pinion jacking system or another kind of jacking system. The first jacking system 17 and the second jacking system 18 preferably use a hydraulic power system but can alternatively use an electrical power system or another kind of power system.

As shown in FIGS. 1 through 14, the multi-section belt 43 is an annular structure large enough to fit around the wind turbine tower. The multi-section belt 43 helps secure the enclosure 13 to the wind turbine tower in order to guide the elevator 5 along the wind turbine tower. The multi-section belt 43 comprises a first belt end 44 and a second belt end 45 corresponding to the terminal ends of the multi-section belt 43 that are secured to the enclosure 13. So, the first belt end 44 and the second belt end 45 are positioned adjacent to the main platform 6 so that the weight of the elevator 5 rests on the multi-section belt 43. In addition, the first belt end 44 is laterally connected to the enclosure 13 to secure the multi-section belt 43 to one side of the enclosure 13. Similarly, the second belt end 45 is laterally connected to the enclosure 13, opposite the first belt end 44, to secure the multi-section belt 43 to the opposite side of the enclosure 13.

In the preferred embodiment, the multi-section belt 43 is a modular annular structure that can be assembled and disassembled at the location of the wind turbine tower. As shown in FIGS. 1 through 14, the multi-section belt 43 comprises a half belt section 46, a first quarter belt section 47, and a second quarter belt section 48. The half belt section 46, the first quarter belt section 47, and the second quarter belt section 48 correspond to three module sections of the multi-section belt 43 that can be transported separately and assembled at the wind turbine tower. The first half belt section 46 corresponds to the largest belt section with a hemispherical shape. The first quarter belt section 47 and the second quarter belt section 48 correspond to two smaller belt sections of equal size. To assemble the multi-section belt 43, the first belt end 44 is terminally coincident with the first quarter belt section 47. In other words, the first quarter belt section 47 is laterally connected to the enclosure 13 at the same location of the first belt end 44. On the other hand, the second belt end 45 is terminally coincident with the second quarter belt section 48. In other words, the second quarter belt section 48 is laterally connected to the enclosure 13, opposite the first quarter belt section 47.

As shown in FIGS. 1 through 14, the first quarter belt section 47 is connected between the first belt end 44 and the half belt section 46. Moreover, the second quarter belt section 48 is connected between the second belt end 45 and the half belt section 46. As a result, the half belt section 46 is connected between the first quarter belt section 47 and the second quarter belt section 48 to complete the annular structure of the multi-section belt 43. Furthermore, different types of fasteners and tools can be utilized to assemble the multi-section belt 43 including, but not limited to, nuts and bolts, splice plates, etc., that allow the disassembly of the multi-section belt 43 if necessary. In other embodiments, the multi-section belt 43 can include a different number of belt sections and different mechanisms can be implemented to help assemble the multi-section belt 43.

As shown in FIGS. 1 through 14, to facilitate the movement of the elevator 5 along the wind turbine tower, the present invention may further comprise a plurality of top rollers 51 and a plurality of bottom rollers 52. The plurality of top rollers 51 and the plurality of bottom rollers 52 help move the multi-section belt 43 along the wind turbine tower by reducing the friction between the outer surface of the wind turbine tower and the multi-section belt 43. In addition, the multi-section belt 43 may also comprise a top annular belt face 49 and a bottom annular belt face 50 corresponding to the two opposite annular faces of the multi-section belt 43. Both the plurality of top rollers 51 and the plurality of bottom rollers 52 are arranged so that each roller engages the outer surface of the wind turbine tower. Further, the plurality of top rollers 51 and the plurality of bottom rollers 52 can be normal mechanical rollers that rotate as the elevator 5 moves along the wind turbine tower. Alternatively, the plurality of top rollers 51 and the plurality of bottom rollers 52 can be motorized rollers that help move the elevator 5 along the wind turbine tower.

As shown in FIGS. 1 through 14, to implement the plurality of top rollers 51 and the plurality of bottom rollers 52, the top annular belt face 49 is oriented towards the main platform 6 while the bottom annular belt face 50 is oriented away from the main platform 6. This ensures that the multi-section belt 43 is concentric with the wind turbine tower. Further, the plurality of top rollers 49 is distributed about the top annular belt face 49 to appropriately distribute the top rollers along the belt sections of the multi-section belt 43. Each of the plurality of top rollers 49 is also mounted onto the top annular belt face 49 to secure each top roller to the corresponding belt section of the multi-section belt 43. Similarly, the plurality of bottom rollers 52 is distributed about the bottom annular belt face 50 to appropriately distribute the bottom rollers along the belt sections of the multi-section belt 43. Further, each of the plurality of bottom rollers 52 is mounted onto the bottom annular belt face 50 to secure each bottom roller to the corresponding belt section of the multi-section belt 43.

Figure 7:
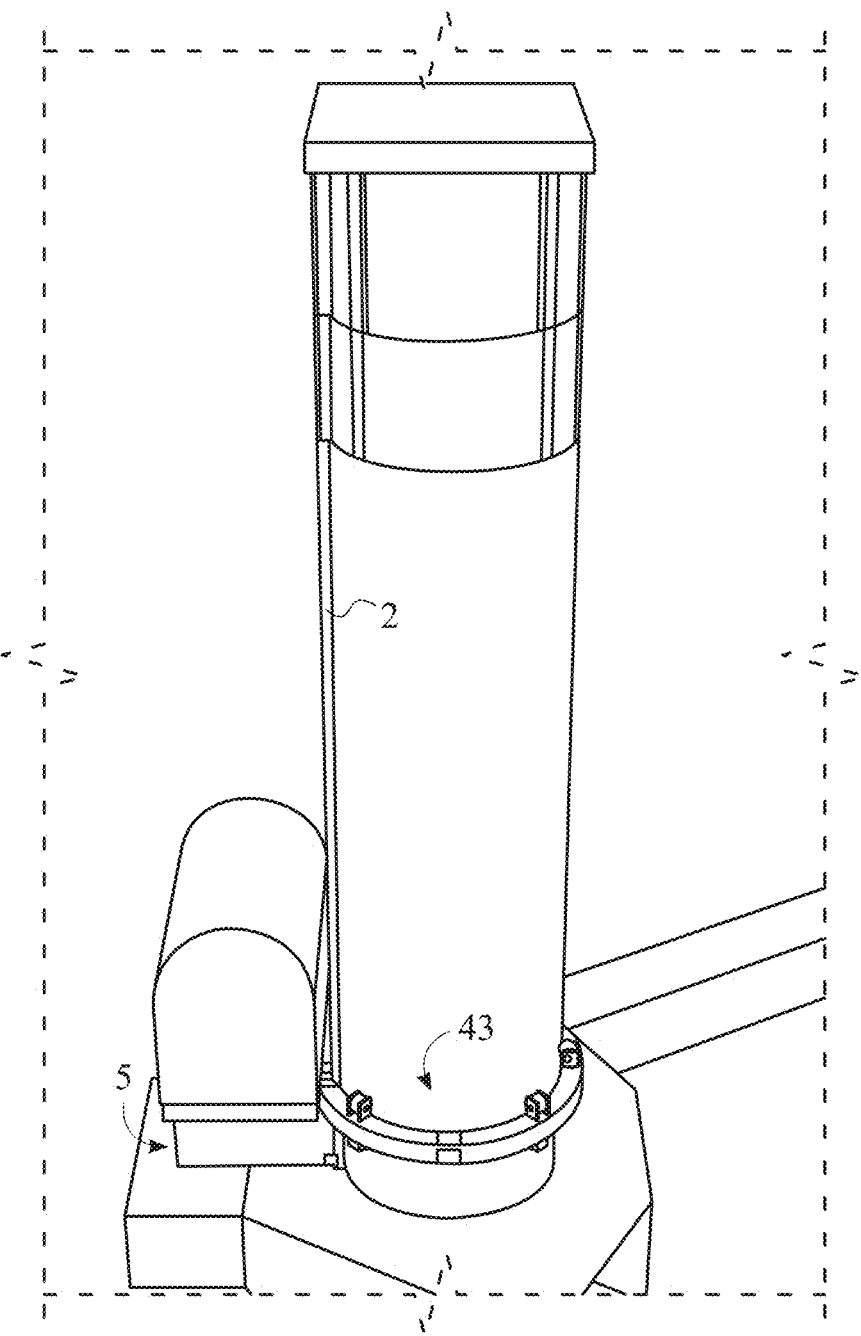
FIG. 7 is a schematic view of the present invention, wherein the present invention is shown lifting a nacelle.
Figure 8:
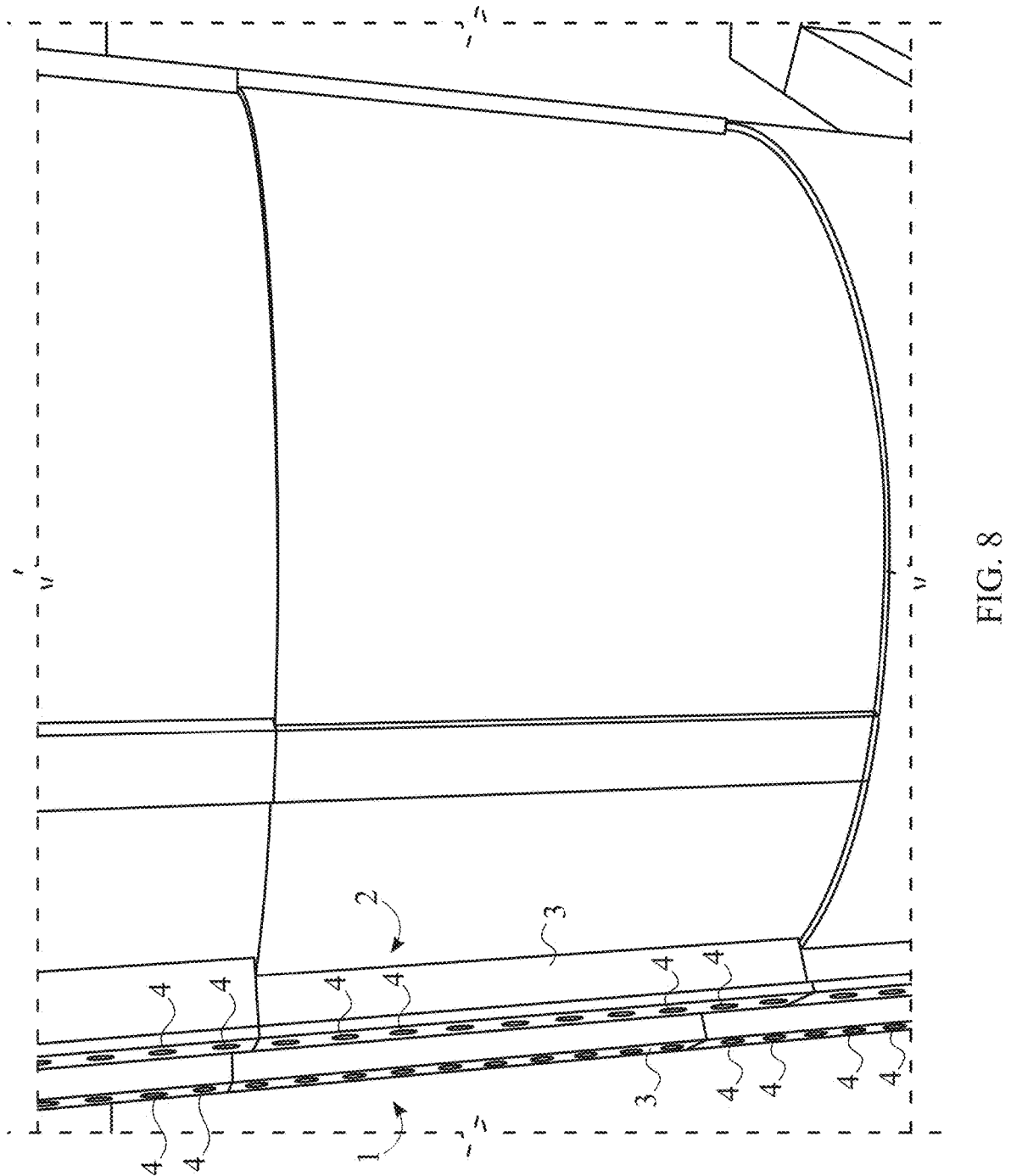
FIG. 8 is a schematic view of the present invention, wherein the first tower rail and the second tower rail are shown connected to the wind turbine tower with varied outer diameter.
Figure 9:
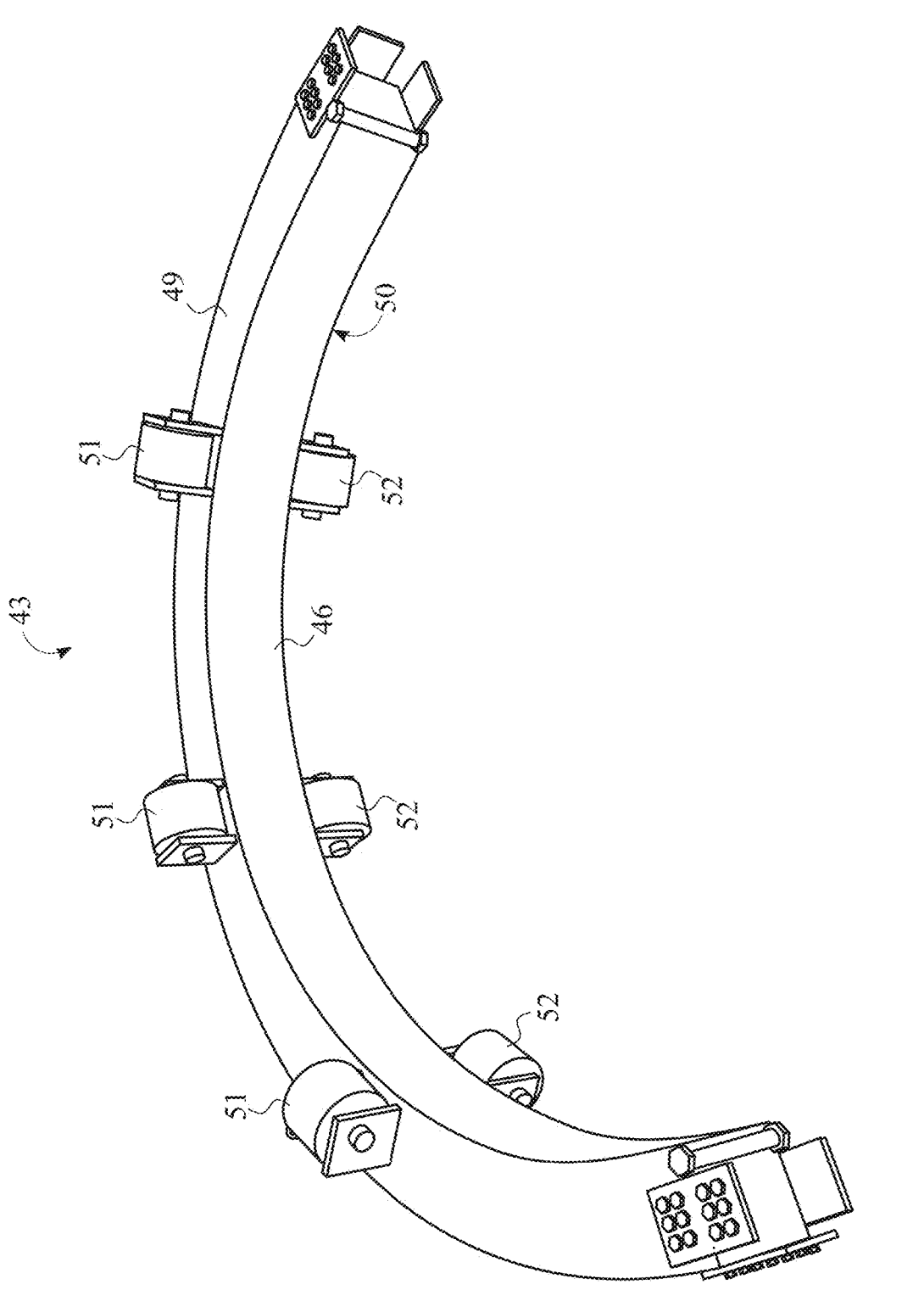
FIG. 9 is a top front perspective view of the half belt section of the multi-section belt of the present invention.
Figure 10:
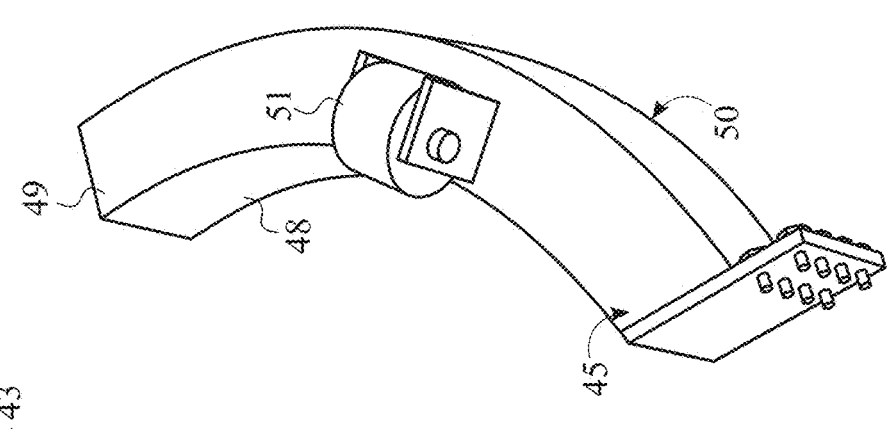
FIG. 10 is a top front perspective view of the first quarter belt section and the second quarter belt section of the multi-section belt of the present invention.
Figure 10:
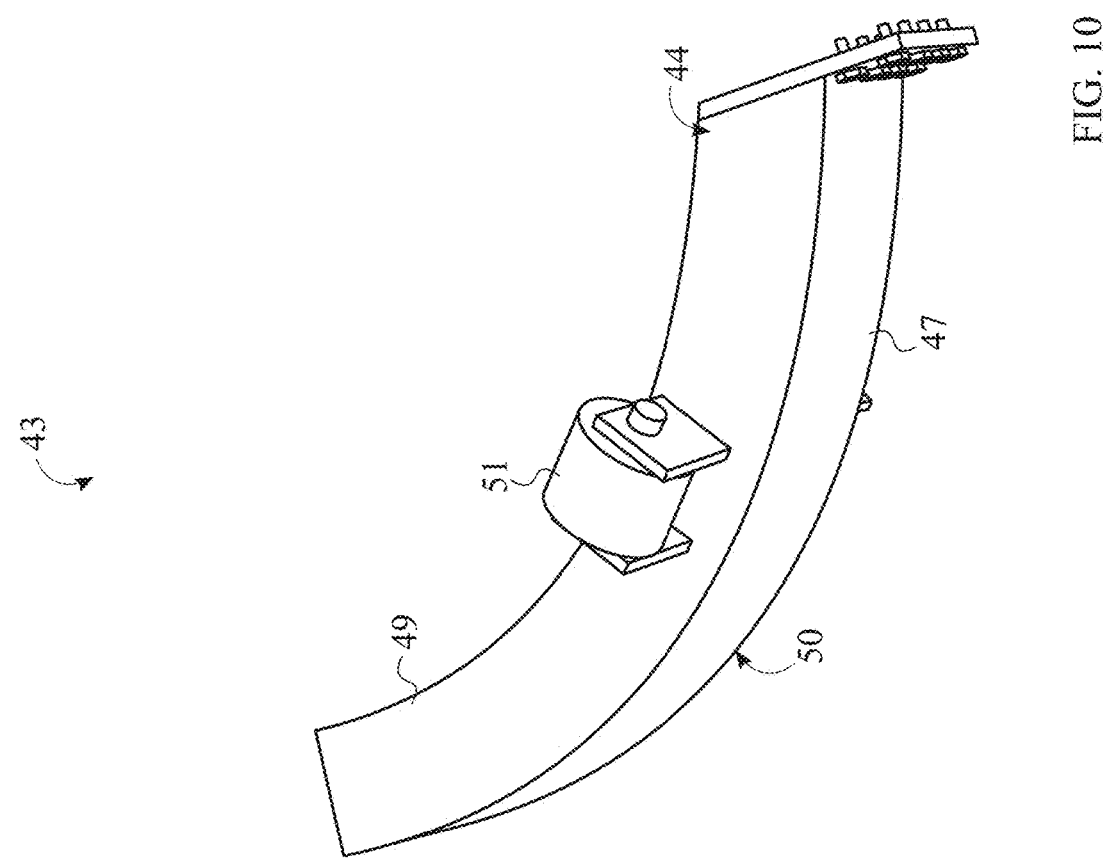
Figure 11:
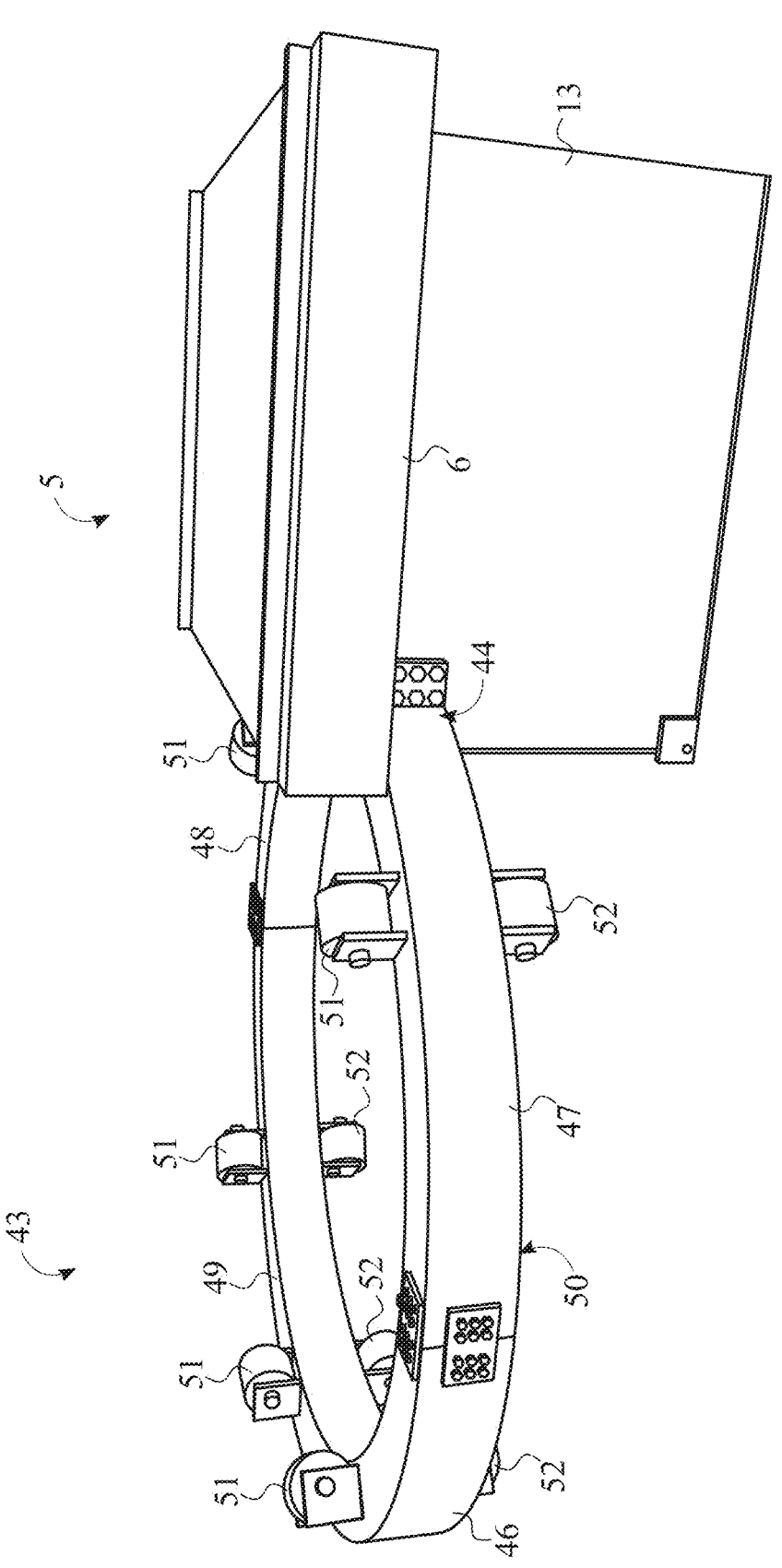
FIG. 11 is a top front perspective view of the present invention, wherein the multi-section belt is connected to the elevator.
Figure 12:
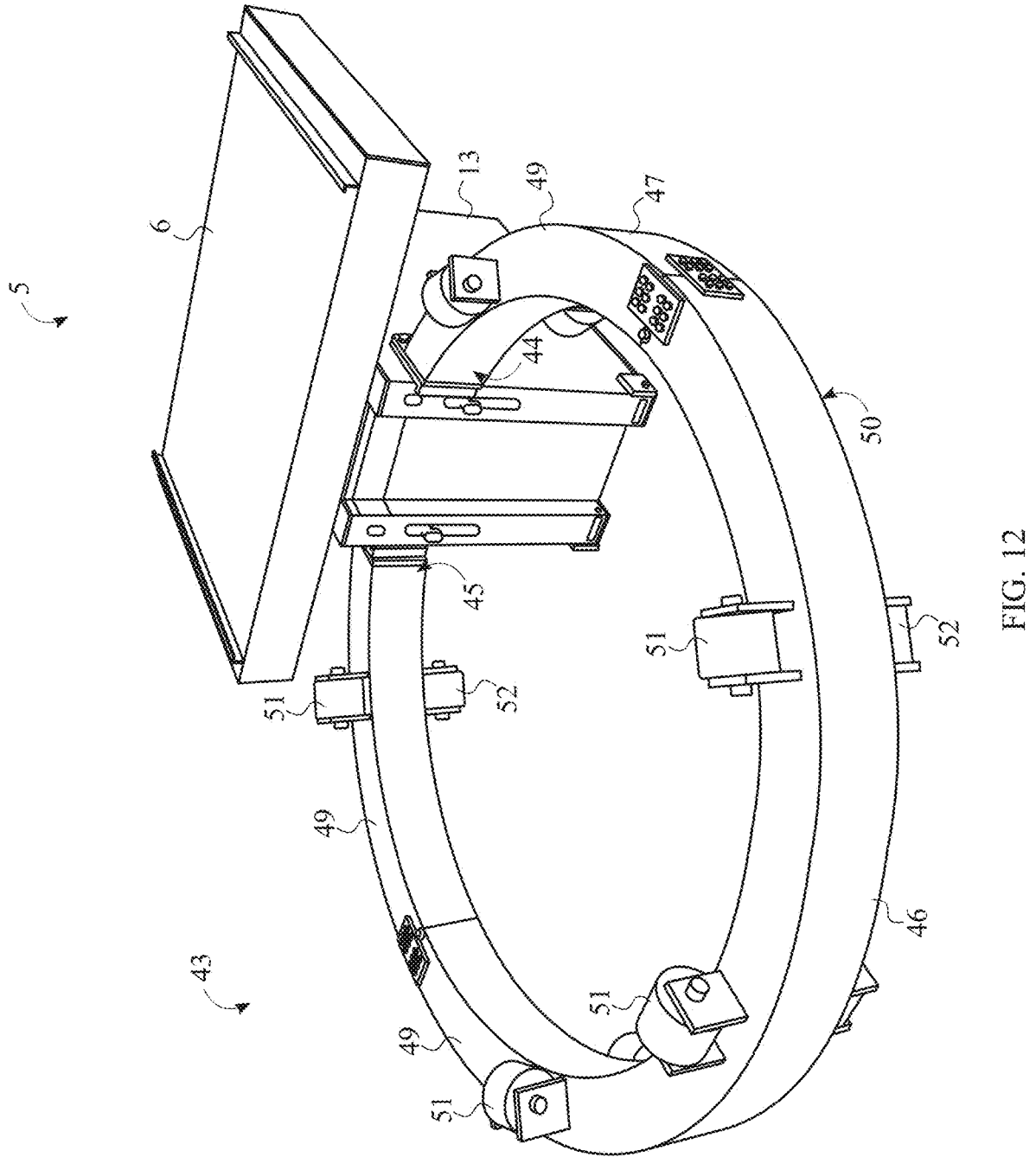
FIG. 12 is a top rear perspective view of the present invention, wherein the multi-section belt is connected to the elevator.
Figure 13:
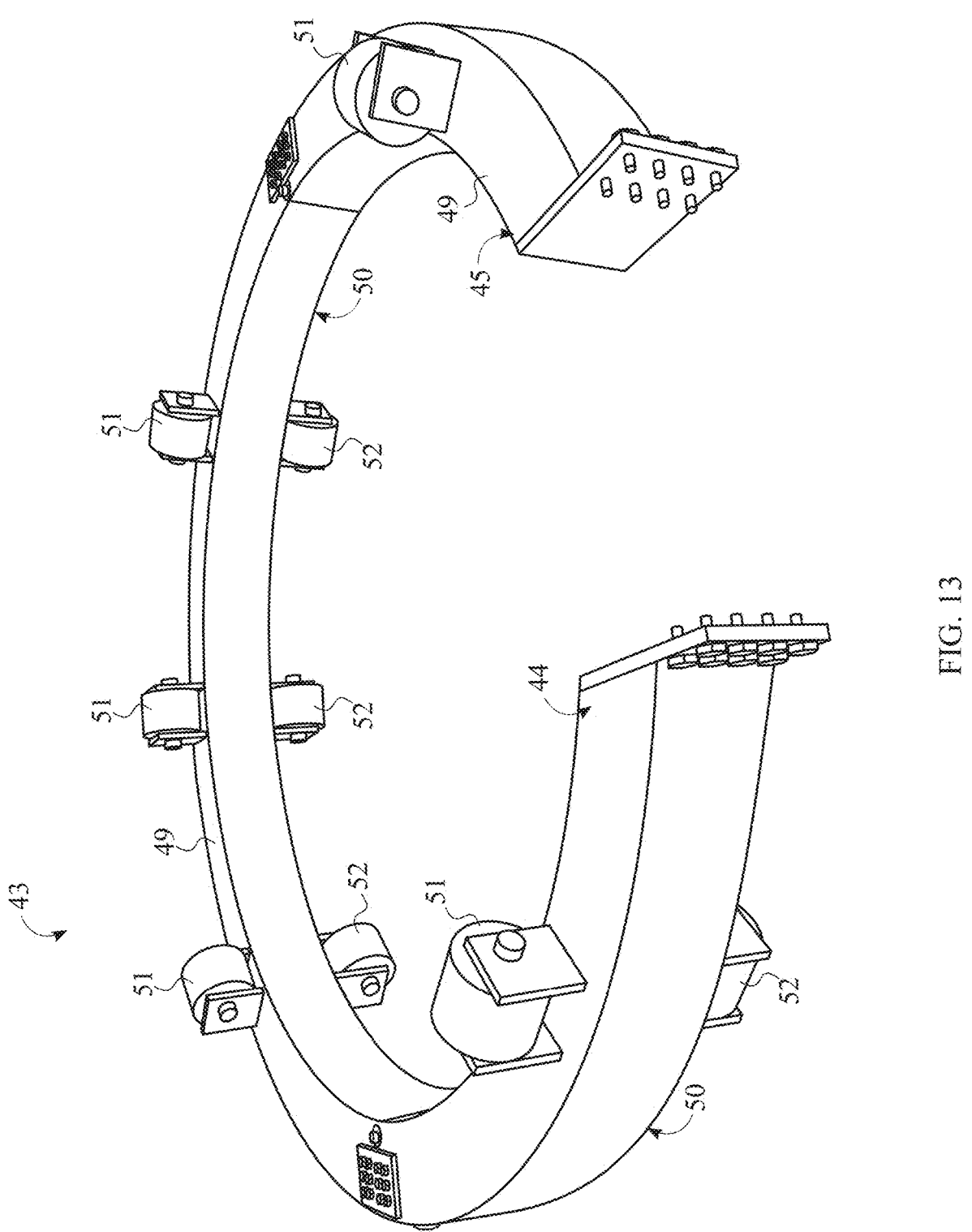
FIG. 13 is a top front perspective view of the multi-section belt of the present invention.

As shown in FIGS. 7 and 8, when the outer diameter of the wind turbine tower varies along the length of the wind turbine tower, a plurality of roller rails can be implemented on the wind turbine tower. The plurality of roller rails includes several roller rails positioned parallel to each other and distributed radially about the wind turbine tower so that each roller rail matches the position of the corresponding roller on the multi-section belt 43. The plurality of roller rails can span the length of the wind turbine tower or can be implemented on the sections of the wind turbine tower where the outer diameter of the wind turbine tower varies. However, if the wind turbine tower has a constant outer diameter, there may be no need for roller rails.

Figure 5:
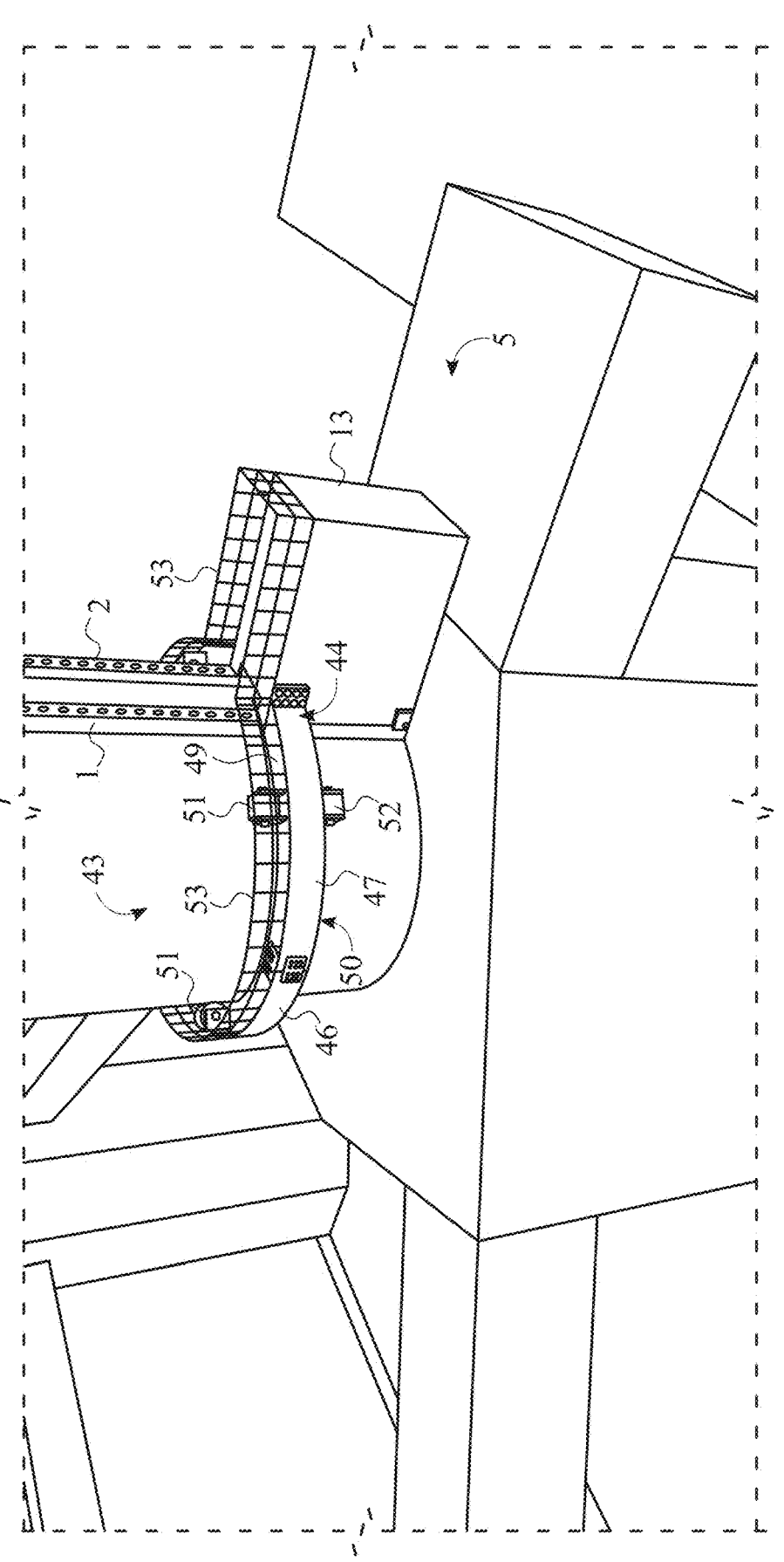
FIG. 5 is a schematic view of the present invention, wherein the multi-section belt is shown with a safety rail.
Figure 6:
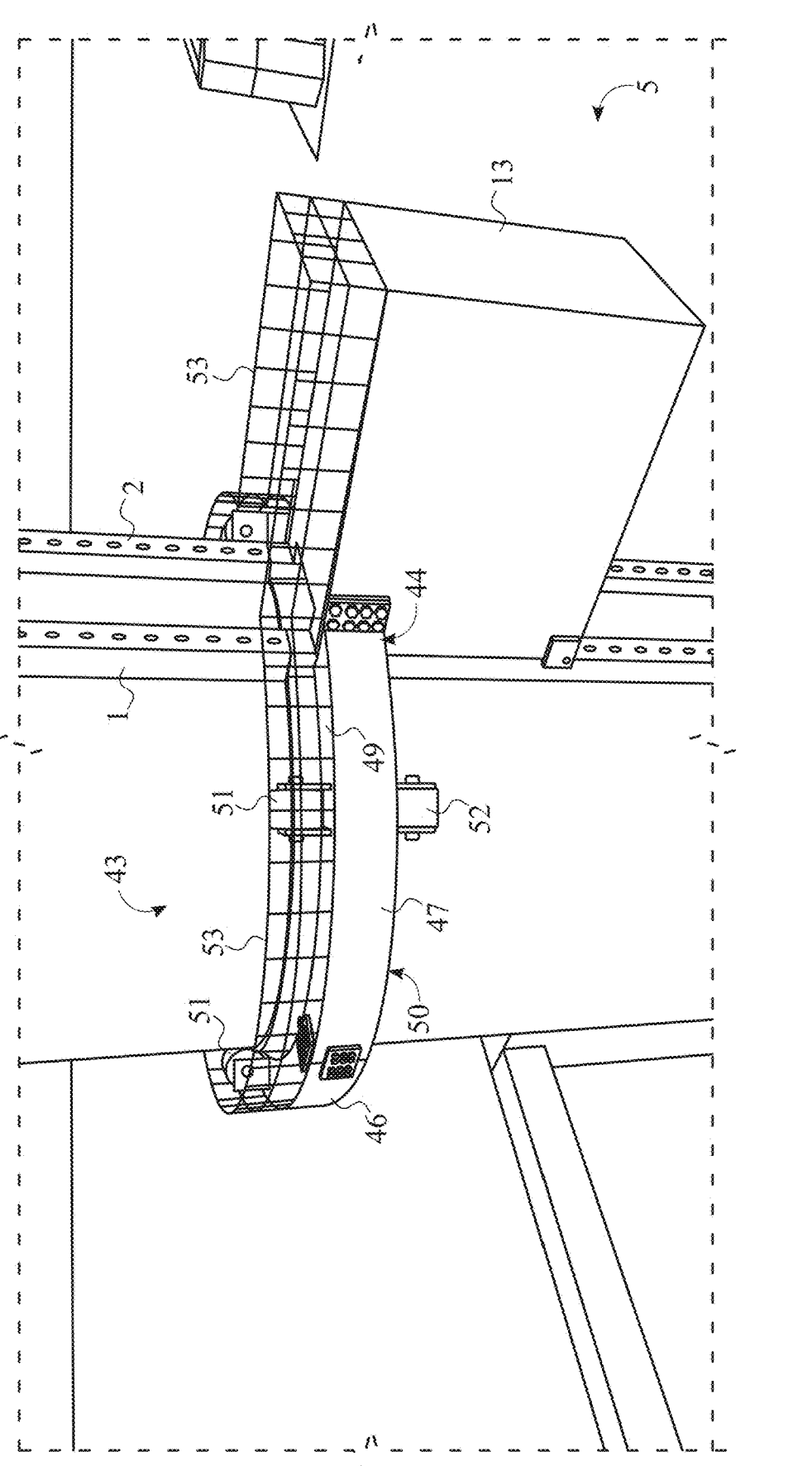
FIG. 6 is a schematic view of the present invention, wherein the multi-section belt is shown with a safety rail, and wherein the present invention is shown moving up along the wind turbine tower.
Figure 14:
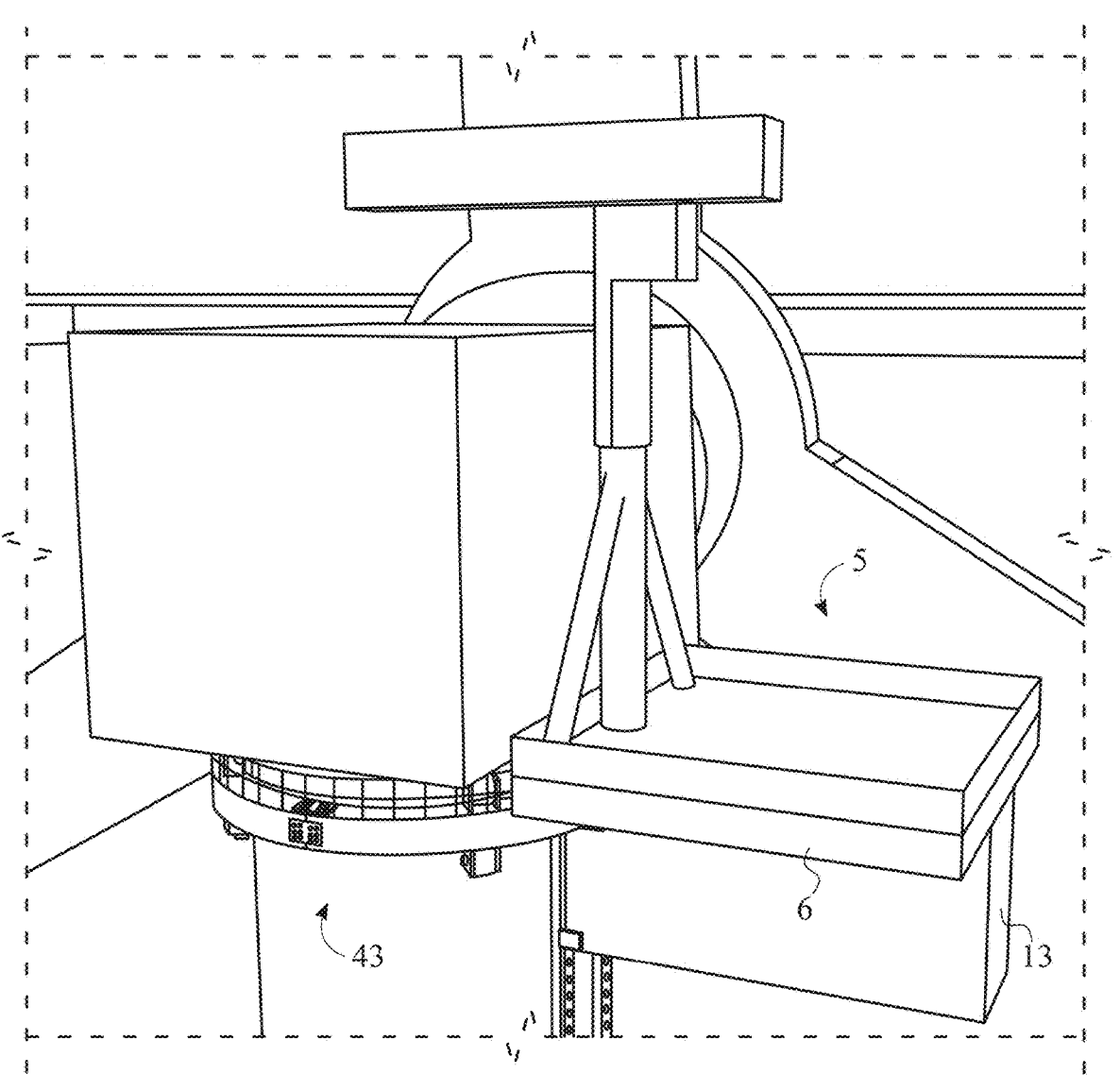
FIG. 14 is a schematic view of the present invention, wherein the present invention is shown with a telescopic crane on the main platform of the elevator.
Figure 15:
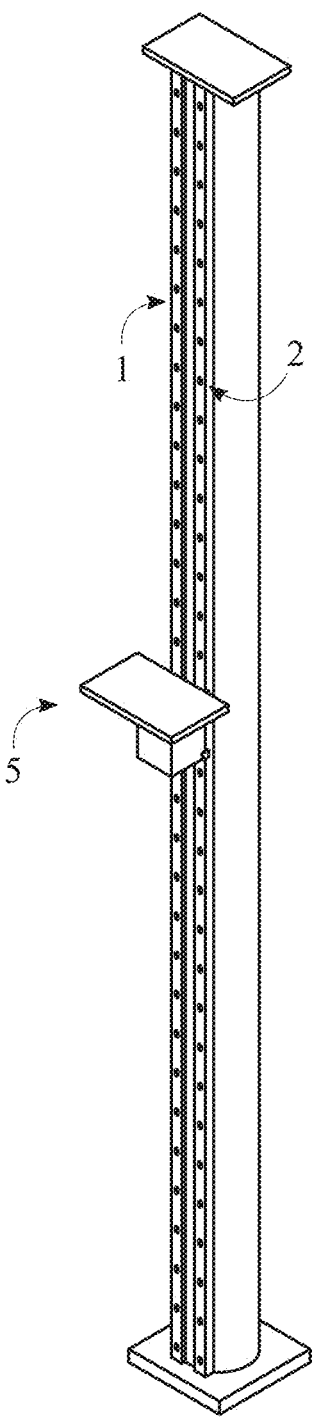
FIG. 15 is a perspective view of the present invention, wherein the present invention is connected to the wind turbine tower.
Figure 16:
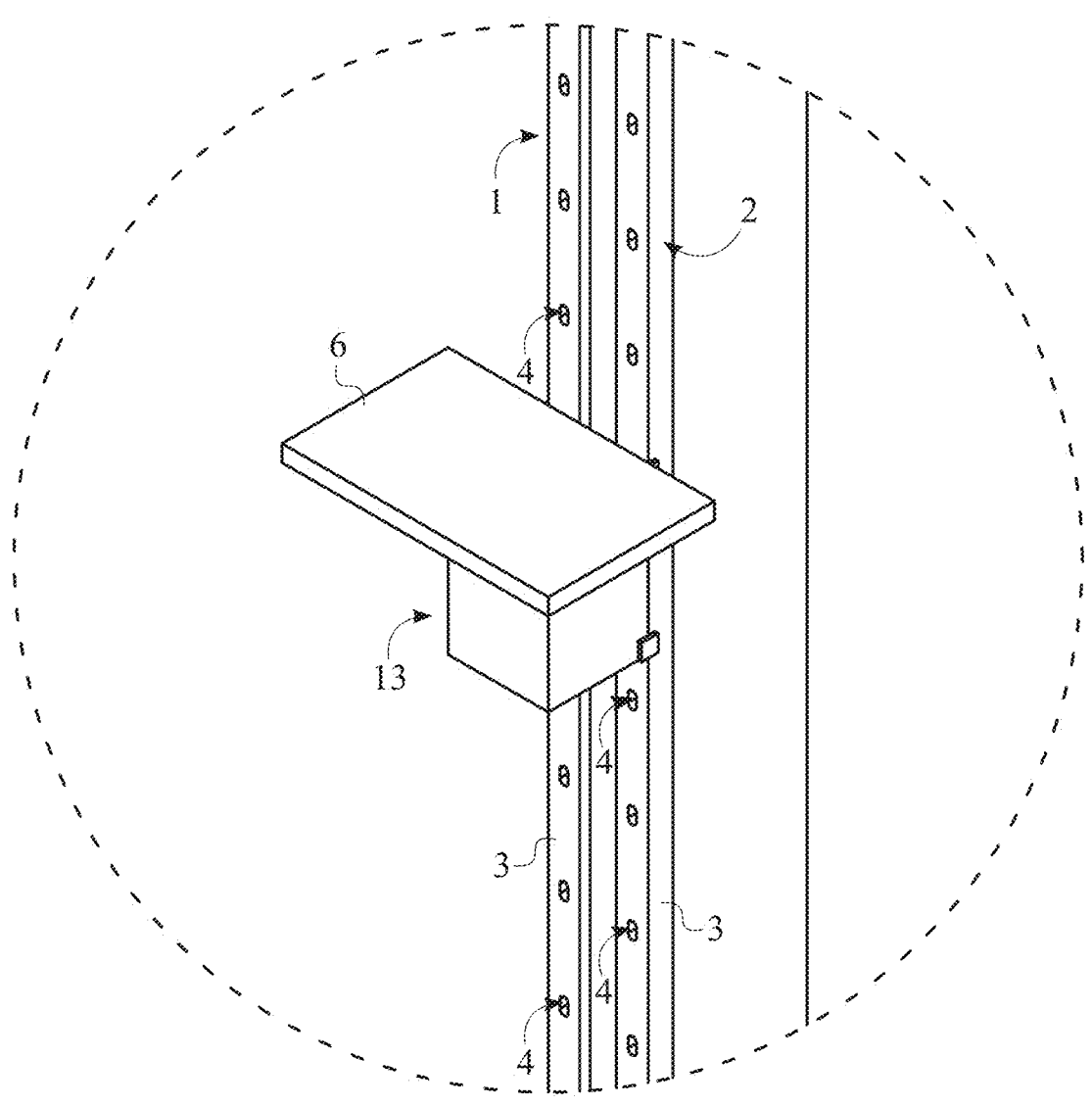
FIG. 16 is a detailed perspective view of the present invention, wherein the present invention is connected to the wind turbine tower.
Figure 17:
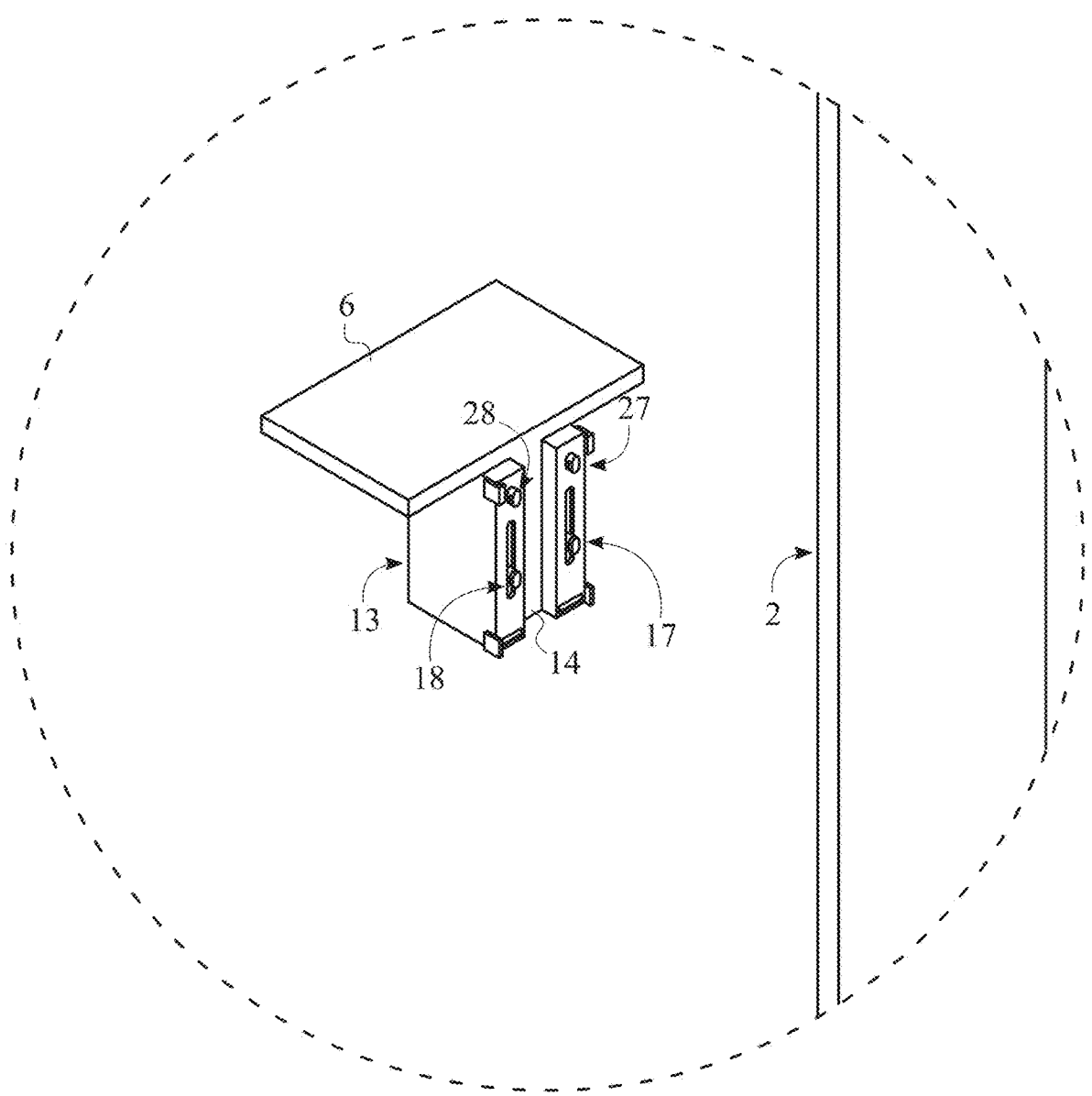
FIG. 17 is a detailed rear exploded view of the present invention.

As previously discussed, the present invention enables the transportation of workers and other tools necessary along the wind turbine tower for the maintenance of the wind turbine. For example, workers and the necessary tools can stand on different sections of the present invention while going up the wind turbine tower. As shown in FIGS. 5, 6, and 14, to prevent the workers and tools from falling off while the present invention is moving, the present invention may further comprise a safety rail 53. In some embodiments, the safety rail 53 is perimetrically connected around the top annular belt face 49 so that the multi-section belt 43 is surrounded by the safety rail 53. This way, workers and tools can be positioned around the wind turbine tower while working on the wind turbine. In other embodiments, the safety rail 53 can extend to the enclosure 13 so that workers and tools can ride on the top panel 15 while the present invention is moving. In alternate embodiments, additional safety mechanisms can be implemented to protect workers and tools being transported by the present invention.

Figure 27:
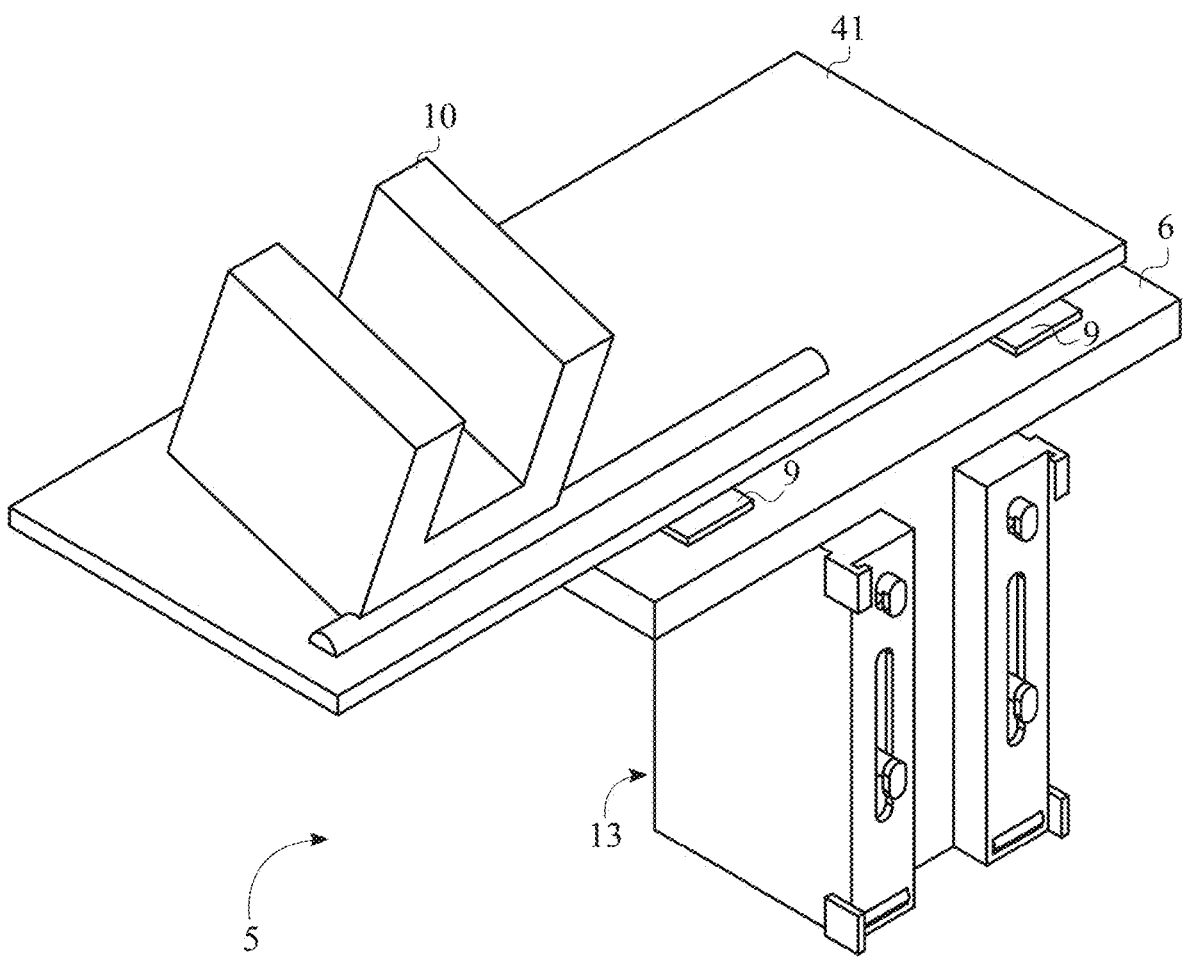
FIG. 27 is a top perspective view of the elevator showing the single-blade grasping system and the conveyor system.
Figure 28:
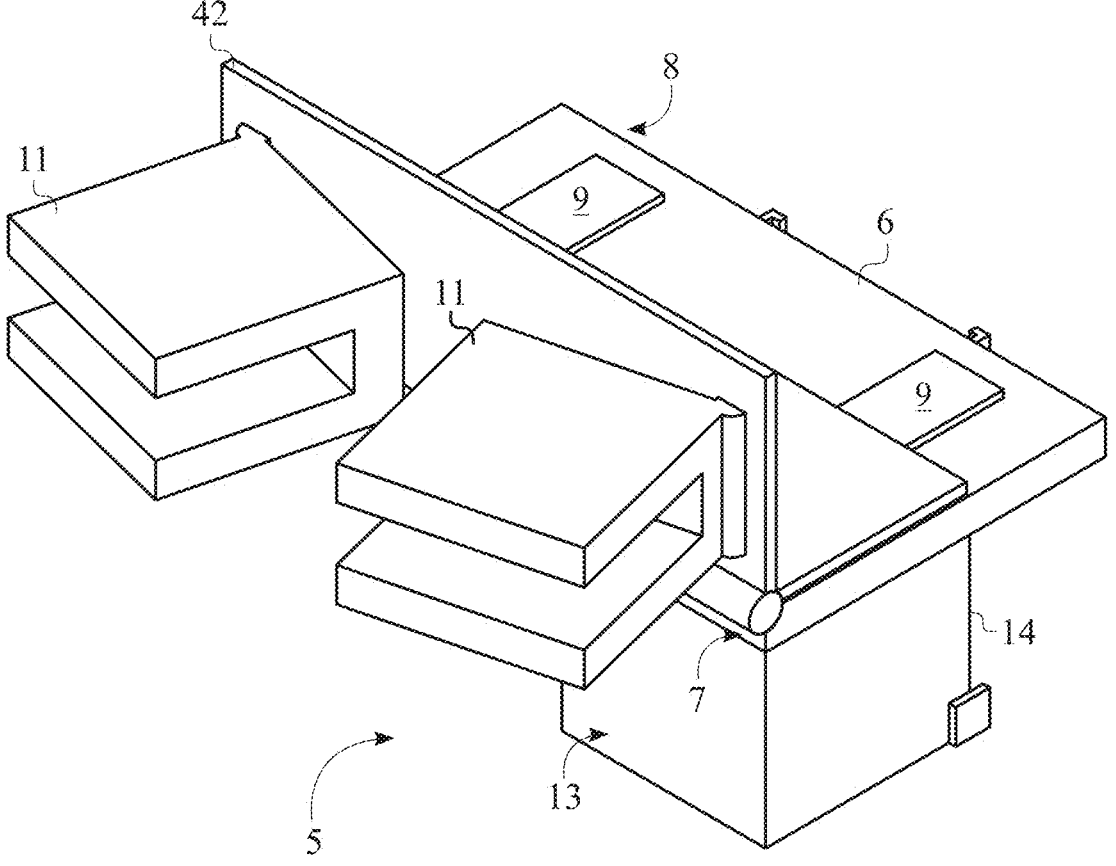
FIG. 28 is a top perspective view of the elevator showing the double-blade grasping system.

As can be seen in FIGS. 14, 27, 28 and 29, different tools can be mounted onto the elevator 5 to help install or perform maintenance on the wind turbine. For example, as can be seen in FIGS. 27 and 28, the single-blade grasping system 10 can be hingedly connected to the main platform 41 via a jack mechanism that allows the single-blade grasping system 10 to tilt in order to orient and align the blade root for engagement under high differential vessel motions and high winds. The double-blade grasping system 11 can be hinge connected to the main platform 42 via a jack mechanism that allows the double-blade grasping system 11 to tilt in order to orient and align the full rotor for engagement under high differential vessel motions and high winds. In addition, as can be seen in FIG. 14, a telescopic crane can be mounted on the main platform 6 to help lift and install heavy parts of the wind turbine. In other embodiments, different tools or accessories can be implemented on the elevator 5 to facilitate the installation and maintenance of the wind turbine.

The first tower rail 1 and the second tower rail 2 function as a pair of tracks so that the elevator 5 can move up and down along the wind turbine tower. In reference to FIG. 15 and FIG. 16, the first tower rail 1 and the second tower rail 2 may each comprise a rail body 3 and a plurality of jacking slots 4. The rail body 3 is an elongated track mounted to the wind turbine tower. As a result, the rail body 3 of the first tower rail 1 and the rail body 3 of the second tower rail 2 are positioned parallel and offset to each other thus creating the pair of tracks. The plurality of jacking slots 4 traverses into the rail body 3 and evenly distributed along the rail body 3. The plurality of jacking slots 4 allows the first jacking system 17, the second jacking system 18, the first locking system 27, and the second locking system 28 to be selectively engaged with the first tower rail 1 and the second tower rail 2 so that the elevator 5 can move upward and downward.

In reference to a standard wind turbine tower, the first tower rail 1 may comprise a first rail, and the second tower rail 2 may comprise a second rail. As a result, the first rail and the second rail are extended from a base of the wind turbine tower to a top end of the wind turbine tower thus allowing the elevator 5 to travel in between the base of the wind turbine tower and the top end of the wind turbine tower.

Figure 30:
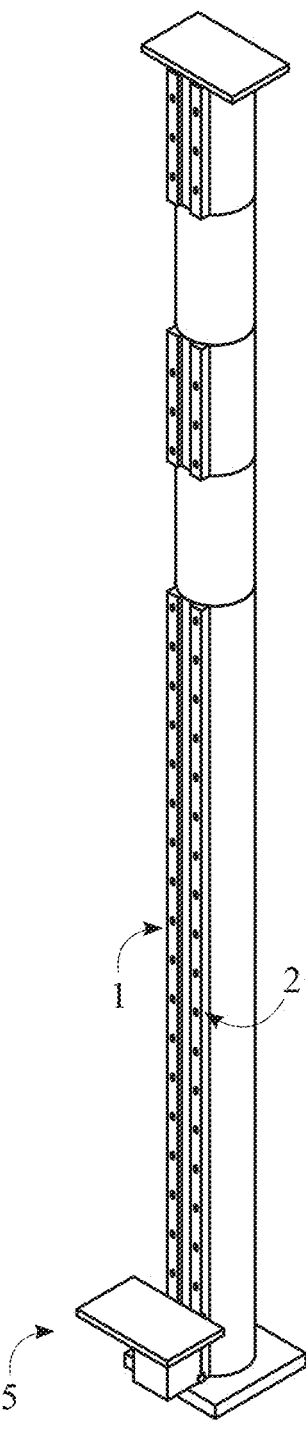
FIG. 30 is a perspective view of the present invention as a telescopic wind turbine tower in its extended configuration.
Figure 31:
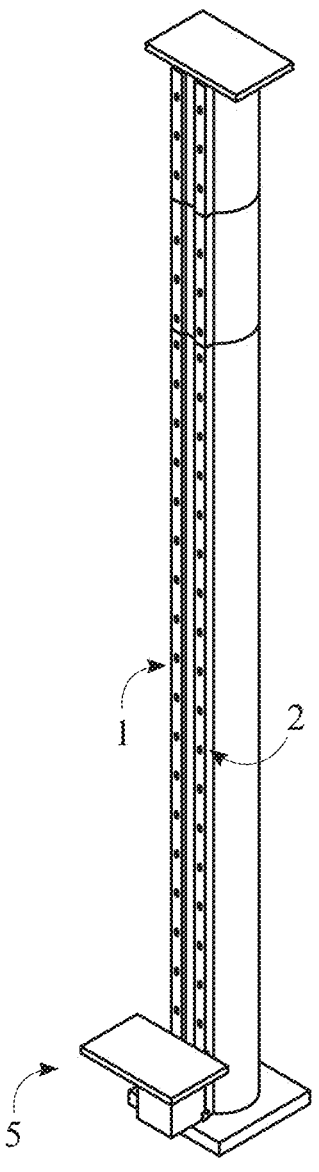
FIG. 31 is a perspective view of the present invention as the telescopic wind turbine tower in its collapsed configuration.
Figure 32:
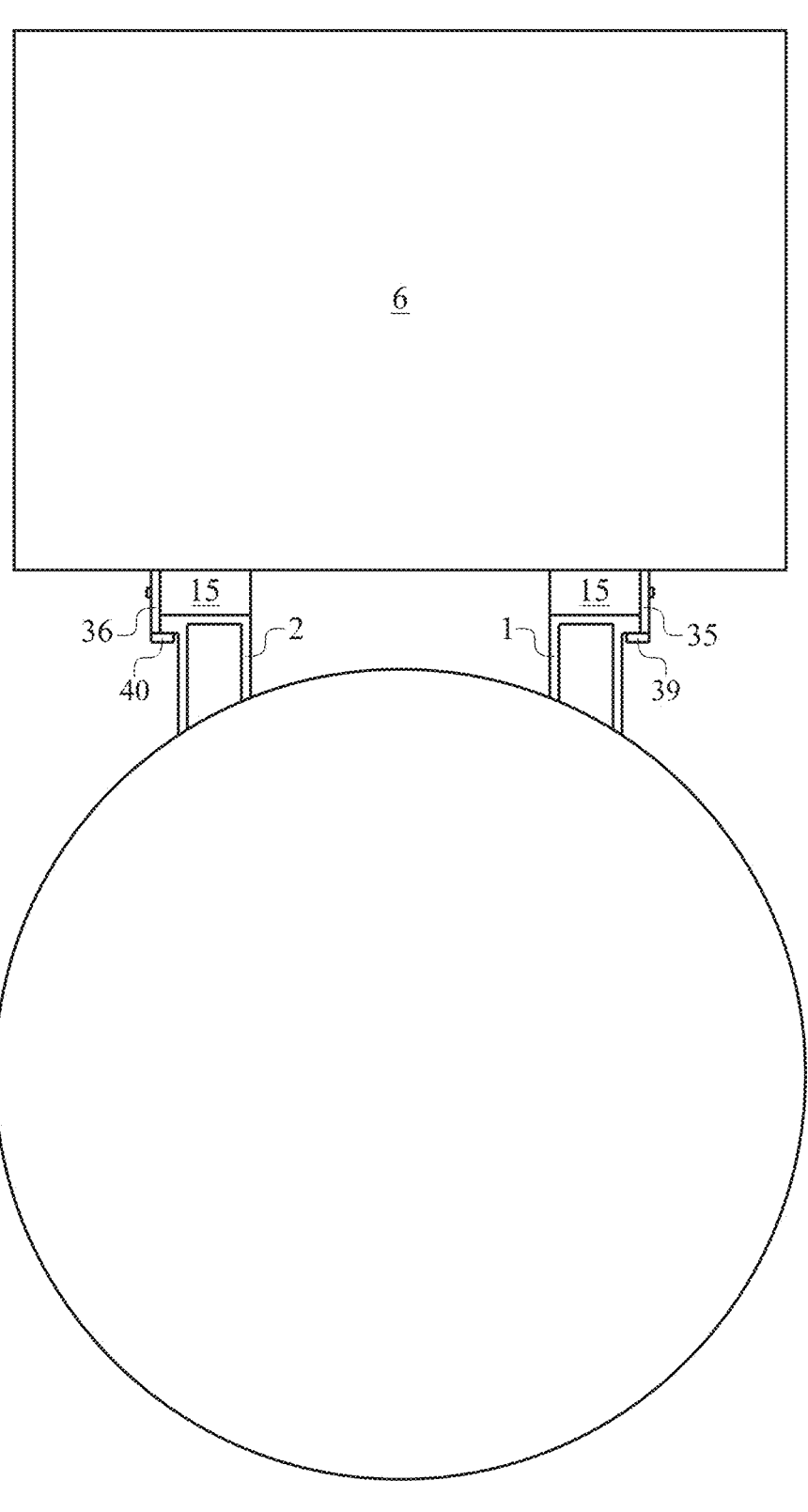
FIG. 32 is a schematic cross-section view of the present invention illustrating how the elevator is connected to the first tower rail and the second tower rail.

In reference to a telescopic wind turbine tower, as shown in FIG. 30 and FIG. 31, the first tower rail 1 may comprise a first bottom-rail, at least one first intermediate-rail, and a first top-rail, while the second tower rail 2 may comprise a second bottom-rail, at least one second intermediate-rail, and a second top-rail. More specifically, the first bottom-rail and the second bottom-rail are connected along a bottom section of the telescopic wind turbine tower and extend from a proximal end of the bottom section to a distal end of the bottom section. The first intermediate-rail and the second intermediate-rail are connected about at least one intermediate section of the telescopic wind turbine tower and only extends along a distal end of the intermediate section. The first top-rail and the second top-rail are connected about a top section of the telescopic wind turbine tower and only extend along a distal end of the top section. Furthermore, the first top-rail is linearly aligned with the first intermediate-rail and the first bottom-rail. The second top-rail is linearly aligned with the second intermediate-rail and the second bottom-rail. In order for the elevator 5 to travel along the telescopic wind turbine tower, the telescopic wind turbine tower has to be positioned within the lowered configuration. In reference to an upward movement, the elevator 5 first travels upward along the first bottom-rail and the second bottom-rail. Once the elevator 5 reaches the proximal end of the bottom section, the elevator 5 can travel onto the intermediate section via the first intermediate-rail and the second intermediate-rail. Finally, the elevator 5 can reach the top section via the first top-rail and the second top-rail. In reference to a downward movement, the elevator 5 first travels downward along the first top-rail and the second top-rail. Once the elevator 5 reaches the proximal end of the intermediate section, the elevator 5 can travel onto the intermediate section via the first intermediate-rail and the second intermediate-rail. Once the elevator 5 reaches the proximal end of the bottom section, the elevator 5 can travel along the bottom section via the first top-rail and the second top-rail until the elevator 5 reaches the base of the wind turbine tower.

Figure 18:
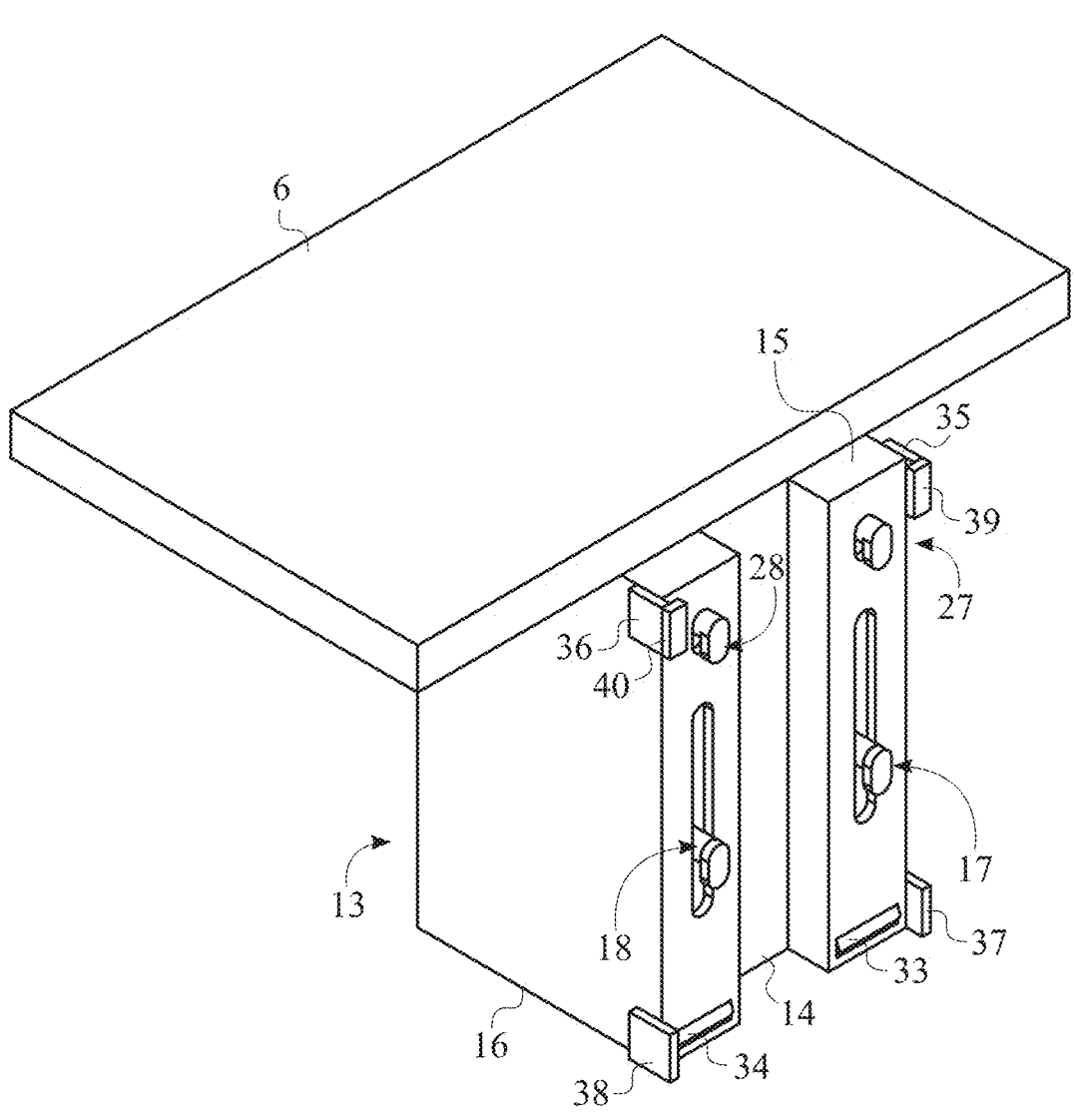
FIG. 18 is a rear perspective view of the elevator of the present invention.
Figure 19:
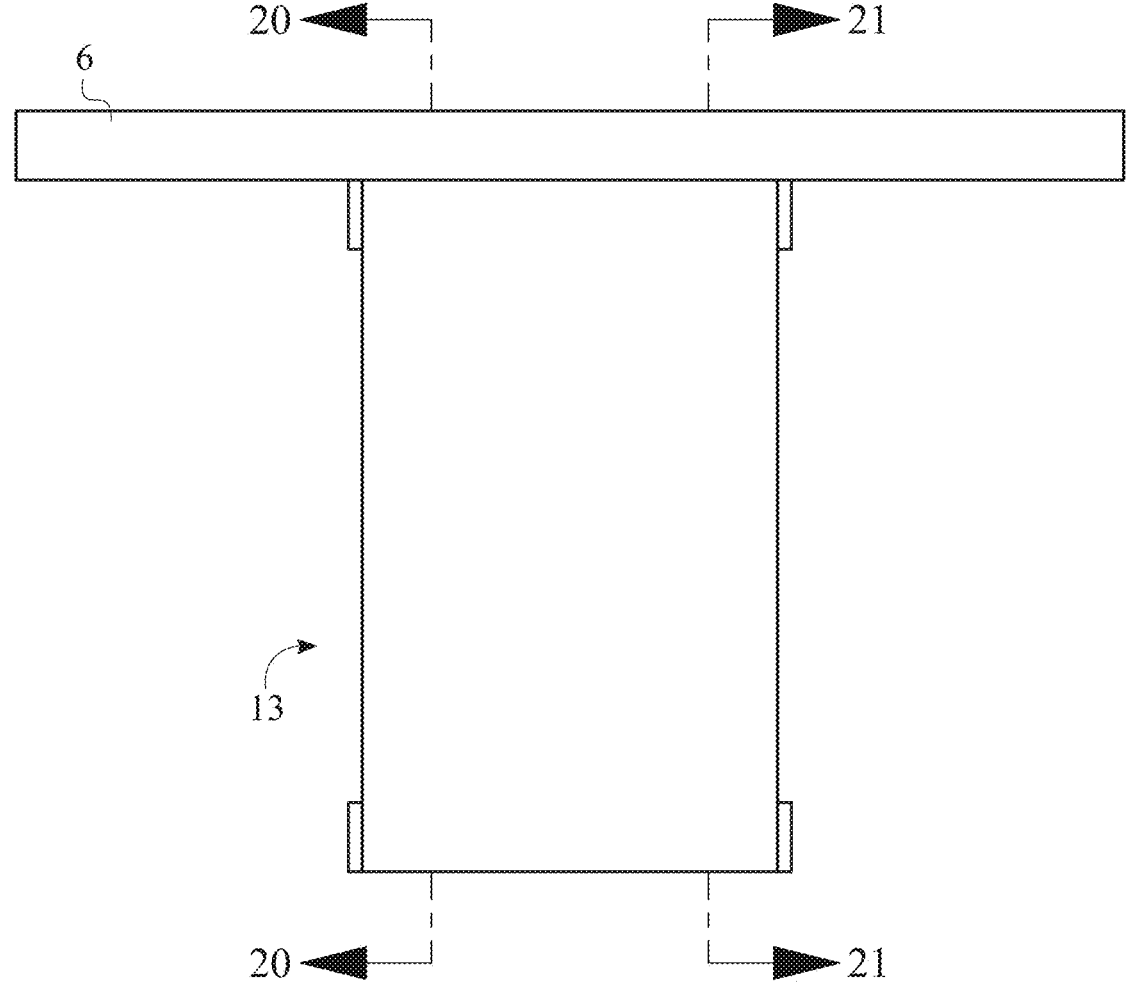
FIG. 19 is a front view of the elevator of the present invention, showing upon which a cross-sectional view is taken shown in FIG. 20 and FIG. 21.

As shown in FIG. 18 and FIG. 19, the enclosure 13 functions as an enclosed housing so that the first jacking system 17, the second jacking system 18, the first locking system 27, and the second locking system 28 can be protected from outside elements. The enclosure 13 may comprise a rear panel 14, a top panel 15, and a bottom panel 16 as the shape of the enclosure 13 can be any geometric form. The main platform 6 is connected to the top panel 15 and positioned perpendicular to the rear panel 14. As result, when the elevator 5 is engaged with the wind turbine tower, the rear panel 14 is positioned adjacent to the first tower rail 1 and the second tower rail 2. The main platform 6 is a structural foundation that can withstand the weight of the transported items. The main platform 6 can be formed into any desired shape as long as the main platform 6 does not limit the upward and downward movements of the elevator 5.

The operation of the first jacking system 17 and the second jacking system 18 allows the elevator 5 to move upward or downward along the wind turbine tower. In reference to FIG. 20 and FIG. 21, the first jacking system 17 and the second jacking system 18 may each comprise a lower jack body 19, a vertical piston rod 20, an elongated slot 22, and a lower locking assembly 23. The lower locking assembly 23 may comprise a jack housing 24, a horizontal shaft 25, and a lower locking body 26. More specifically, the lower jack body 19 is mounted within the enclosure 13. The vertical piston rod 20 is operatively coupled to the lower jack body 19, wherein the lower jack body 19 actuates the linear movement of the vertical piston rod 20. The lower locking assembly 23 is connected to a free end 21 of the vertical piston rod 20 as the lower locking assembly 23 selectively engages with the first tower rail 1 and the second tower rail 2 to achieve the linear movement of the elevator 5. The elongated slot 22 traverses through the rear panel 14 of the enclosure 13 so that the lower locking assembly 23 is able to move in and out of the enclosure 13. In other words, the elongated slot 22 is linearly extended in between the top panel 15 and the bottom panel 16 of the enclosure 13 and positioned parallel to the vertical piston rod 20 so that the lower locking assembly 23 is able to move along the elongated slot 22 with the linear movement of the vertical piston rod 20. The jack housing 24 is connected to the free end 21 of the vertical piston rod 20. The horizontal shaft 25 is operatively coupled to the jack housing 24, wherein the jack housing 24 actuates the lateral movement of the horizontal shaft 25 as the horizontal shaft 25 is slidably positioned along the elongated slot 22. The lower locking body

26 is connected to a free end 21 of the horizontal shaft 25 and is configured to engage with each of the plurality of jacking slots 4.

The operation of the first locking system 27 and the second locking system 28 allows the elevator 5 to be secured to the first tower rail 1 and the second tower rail 2 during the upward or downward movement of the elevator 5. In reference to FIG. 20 and FIG. 21, the first locking system 27 and the second locking system 28 may each comprise an upper jack body 29, a horizontal piston rod 30, a locking channel 31, and an upper locking body 32. More specifically, the upper jack body 29 is mounted within the enclosure 13. The horizontal piston rod 30 is operatively coupled to the upper jack body 29, wherein the upper jack body 29 actuates the linear movement of the horizontal piston rod 30. The locking channel 31 traverses through the rear panel 14 of the enclosure 13 and is positioned adjacent to the top panel 15 of the enclosure 13. The horizontal piston rod 30 is slidably positioned within the locking channel 31 as the locking channel 31 allows the horizontal piston rod 30 to move in and out of the enclosure 13. The upper locking body 32 is connected to a free end 21 of the horizontal piston rod 30 and is configured to engage with each of the plurality of jacking slots 4.

Figure 22:
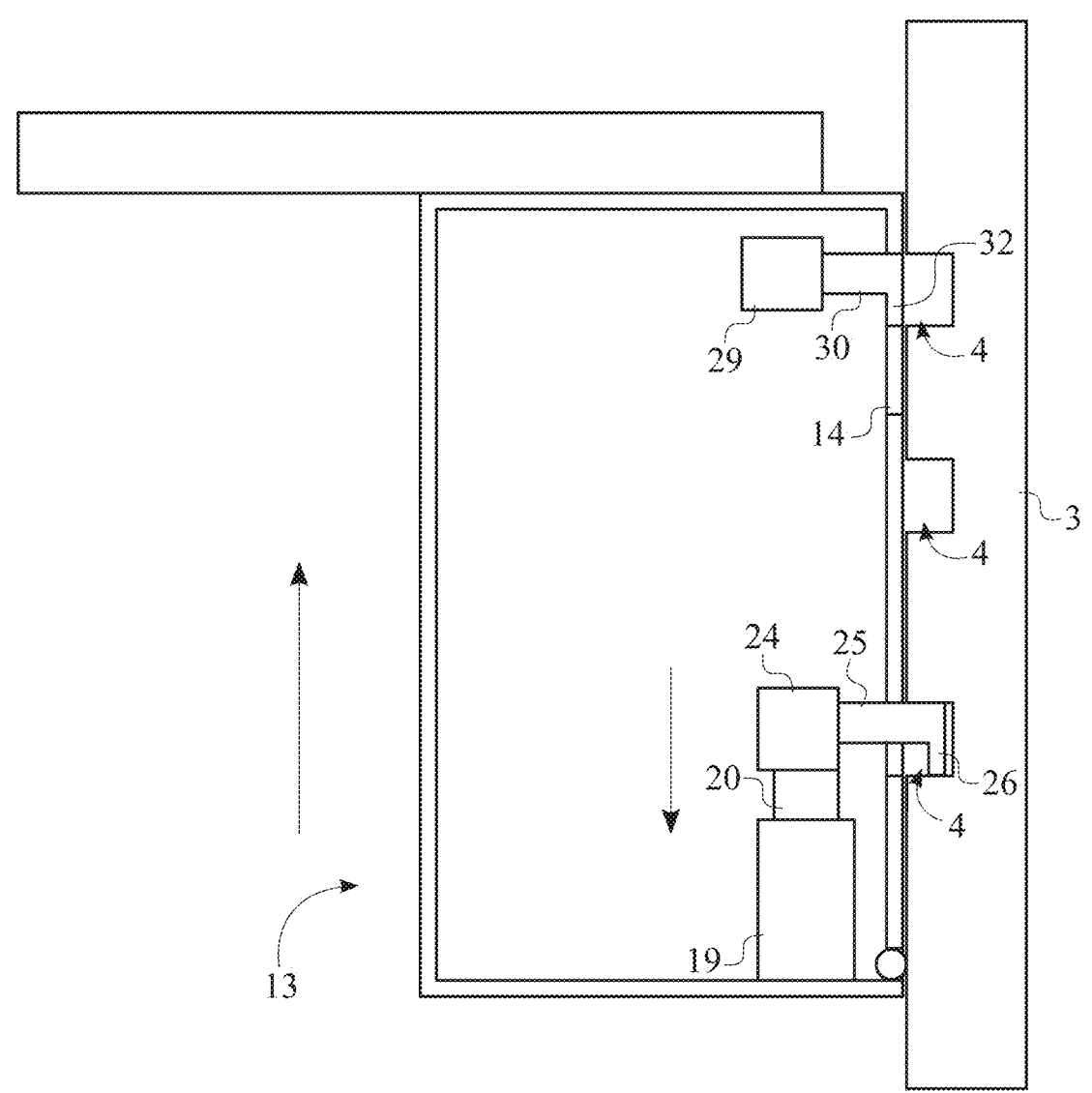
FIG. 22 is a schematic diagram showing the upward movement of the elevator, the operation of the first jacking system and the second jacking system, and the positioning of the first locking system and the second locking system.
Figure 23:
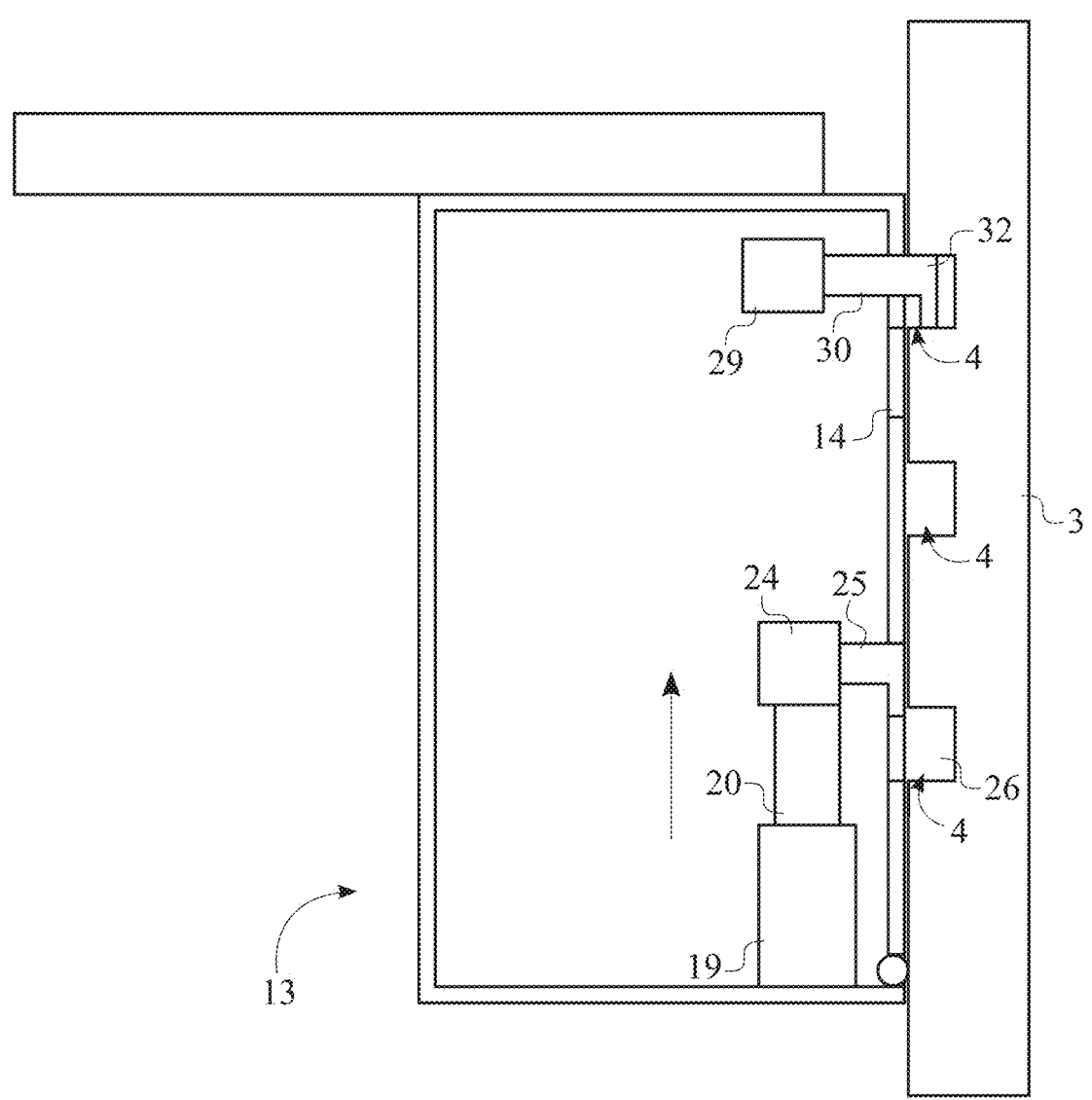
FIG. 23 is a schematic diagram showing the stationary positioning of the elevator, the operation of the first jacking system and the second jacking system, and the positioning of the first locking system and the second locking system.

In reference to the upward movement of the elevator 5, as shown in FIG. 22 and FIG. 23, the lower locking body 26 of the first jacking system 17 is concentrically engaged within a lower arbitrary slot of the plurality of jacking slots 4 of the first tower rail 1. The lower locking body 26 of the second jacking system 18 is concentrically engaged within a lower corresponding slot of the plurality of jacking slots 4 of the second tower rail 2, wherein the lower corresponding slot is positioned opposite of the lower arbitrary slot. Due to the aforementioned engagement, the elevator 5 can be secured to the first tower rail 1 via the lower locking body 26 of the first jacking system 17 and to the second tower rail 2 via the lower locking body 26 of the second jacking system 18 thus allowing the linear movement of the vertical piston rod 20 to move the elevator 5 upward. In other words, the vertical piston rod 20 goes from an extended position to a retracted position so that the elevator 5 can move upward. The upward movement of the elevator 5 ends when the vertical piston rod 20 reaches the retracted position. Then, the upper locking body 32 of the first locking system 27 is concentrically engaged within an upper arbitrary slot of the plurality of jacking slots 4 of the first tower rail 1. The upper locking body 32 of the second locking system 28 is concentrically engaged within an upper corresponding slot of the plurality of jacking slots 4 of the second tower rail 2, wherein the upper corresponding slot is positioned opposite of the upper arbitrary slot. Due to the aforementioned engagement, the elevator 5 can be secured to the first tower rail 1 via the upper locking body 32 of the first locking system 27 and to the second tower rail 2 via the upper locking body 32 of the second locking system 28. As a result, the lower locking body 26 of the first jacking system 17 and the lower locking body 26 of the second jacking system 18 are able to withdraw from the first tower rail 1 and the second tower rail 2, respectively. Then, the vertical piston rod 20 can be configured back to the extended position from the retracted position to initiate the upward movement of the elevator 5.

Figure 24:
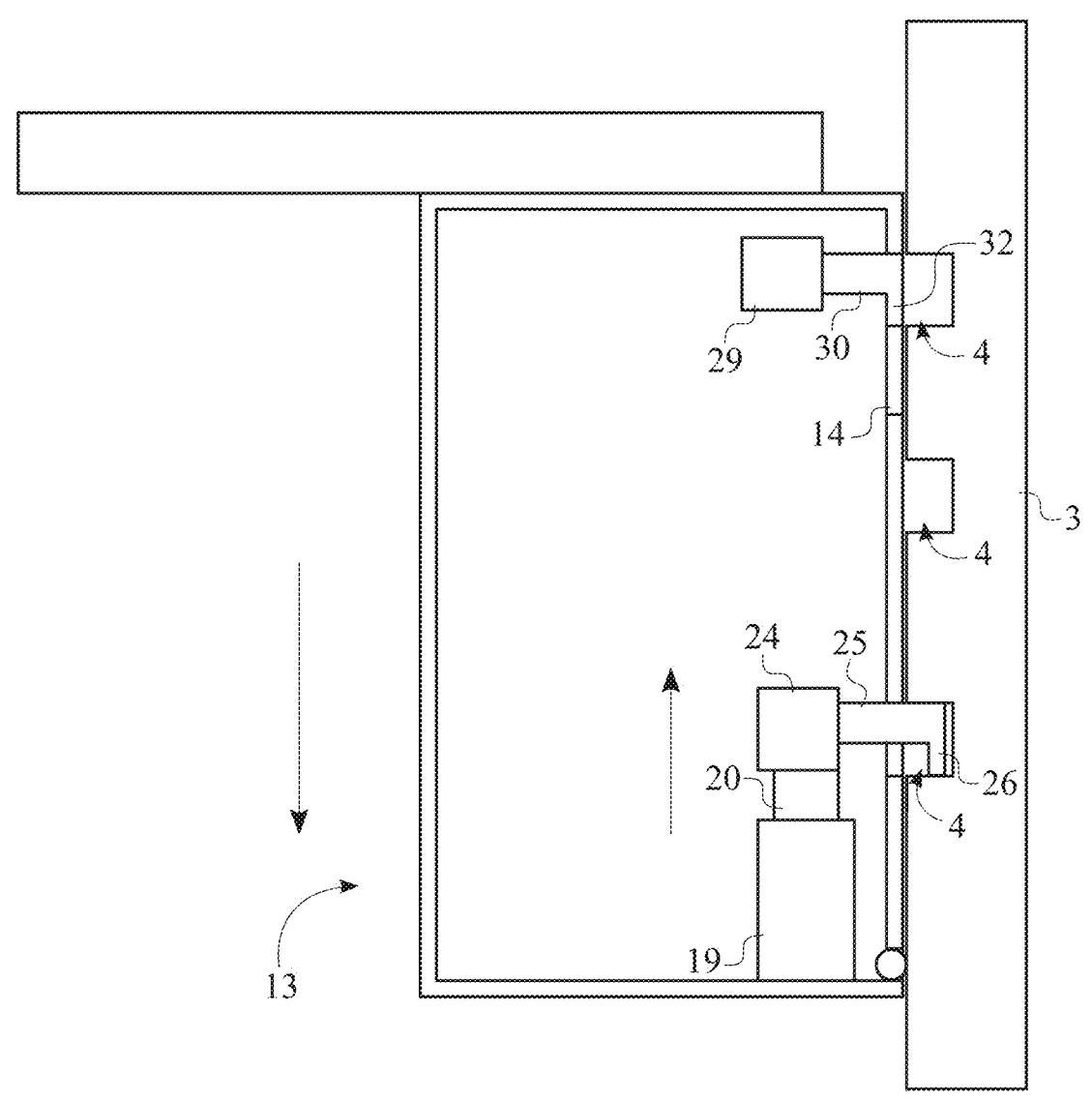
FIG. 24 is a schematic diagram showing the downward movement of the elevator, the operation of the first jacking system and the second jacking system, and the positioning of the first locking system and the second locking system.
Figure 25:
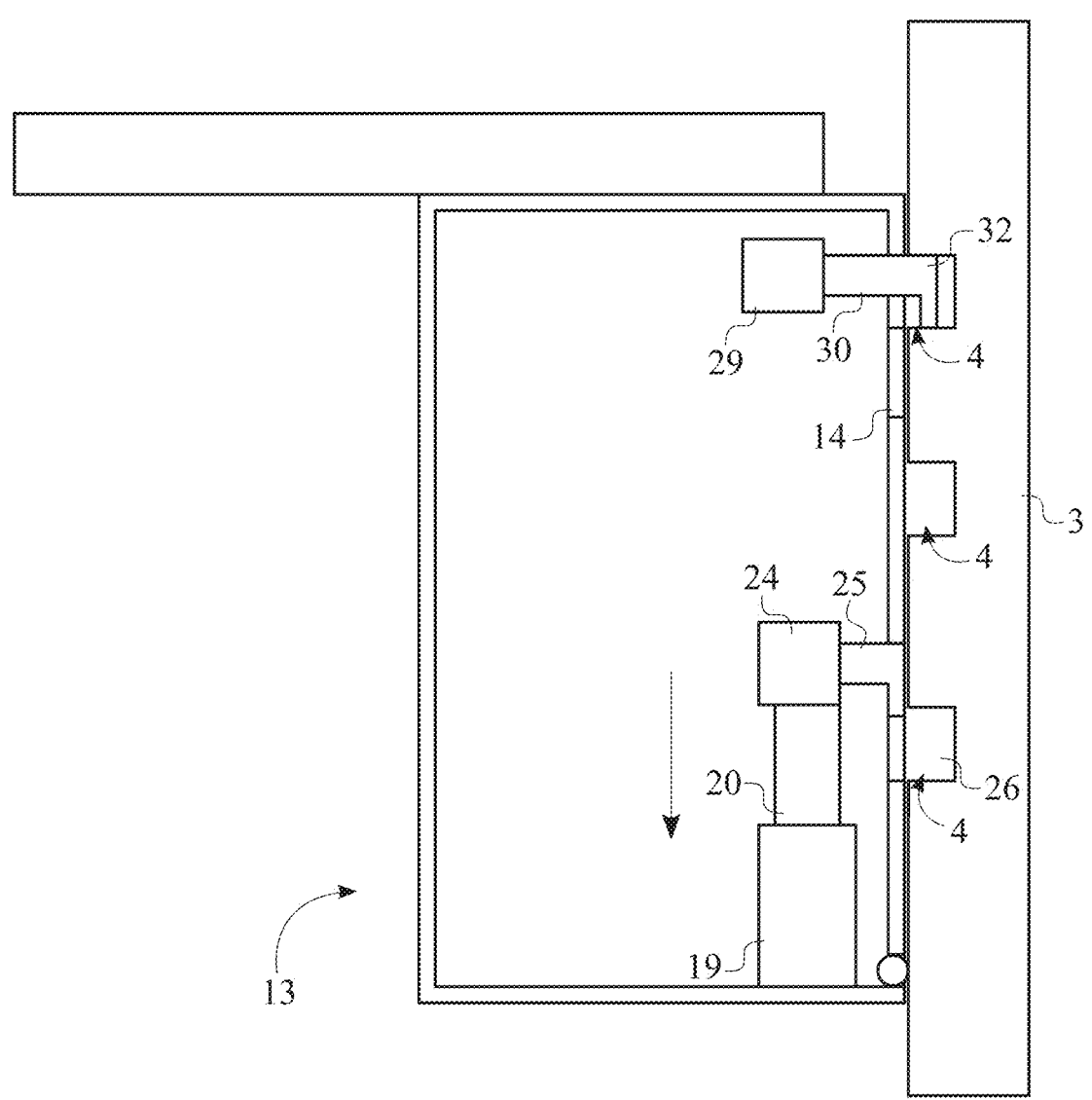
FIG. 25 is a schematic diagram showing the stationary positioning of the elevator, the operation of the first jacking system and the second jacking system, and the positioning of the first locking system and the second locking system.

In reference to the downward movement of the elevator 5, as shown in FIG. 24 and FIG. 25, the lower locking body 26 of the first jacking system 17 is concentrically engaged within a lower arbitrary slot of the plurality of jacking slots 4 of the first tower rail 1. The lower locking body 26 of the second jacking system 18 is concentrically engaged within a lower corresponding slot of the plurality of jacking slots 4 of the second tower rail 2, wherein the lower corresponding slot is positioned opposite of the lower arbitrary slot. Due to the aforementioned engagement, the elevator 5 can be secured to the first tower rail 1 via the lower locking body 26 of the first jacking system 17 and to the second tower rail 2 via the lower locking body 26 of the second jacking system 18 thus allowing the linear movement of the vertical piston rod 20 to move the elevator 5 downward. In other words, the vertical piston rod 20 goes from the retracted position to the extended position so that the elevator 5 can move upward. The downward movement of the elevator 5 ends when the vertical piston rod 20 reaches the extended position. Then, the upper locking body 32 of the first locking system 27 is concentrically engaged within an upper arbitrary slot of the plurality of jacking slots 4 of the first tower rail 1. The upper locking body 32 of the second locking system 28 is concentrically engaged within an upper corresponding slot of the plurality of jacking slots 4 of the second tower rail 2, wherein the upper corresponding slot is positioned opposite of the upper arbitrary slot. Due to the aforementioned engagement, the elevator 5 can be secured to the first tower rail 1 via the upper locking body 32 of the first locking system 27 and to the second tower rail 2 via the upper locking body 32 of the second locking system 28. As a result, the lower locking body 26 of the first jacking system 17 and the lower locking body 26 of the second jacking system 18 are able to withdraw from the first tower rail 1 and the second tower rail 2, respectively. Then, the vertical piston rod 20 can be configured back to the retracted position from the extended position to initiate the down movement of the elevator 5.

Figure 20:
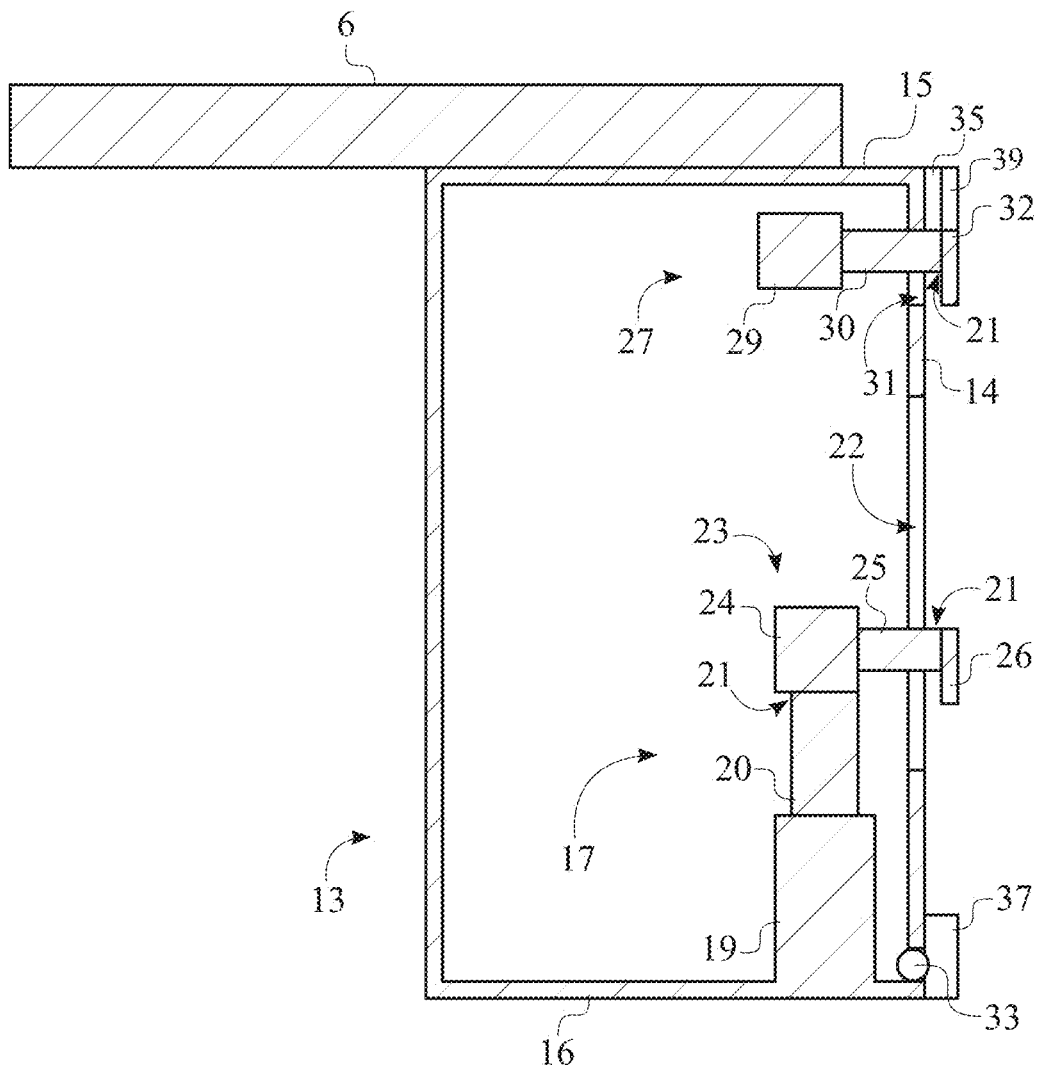
FIG. 20 is a cross-sectional view of the elevator of the present invention showing the first jacking system and the first locking system along line 20-20 of FIG. 19.
Figure 21:
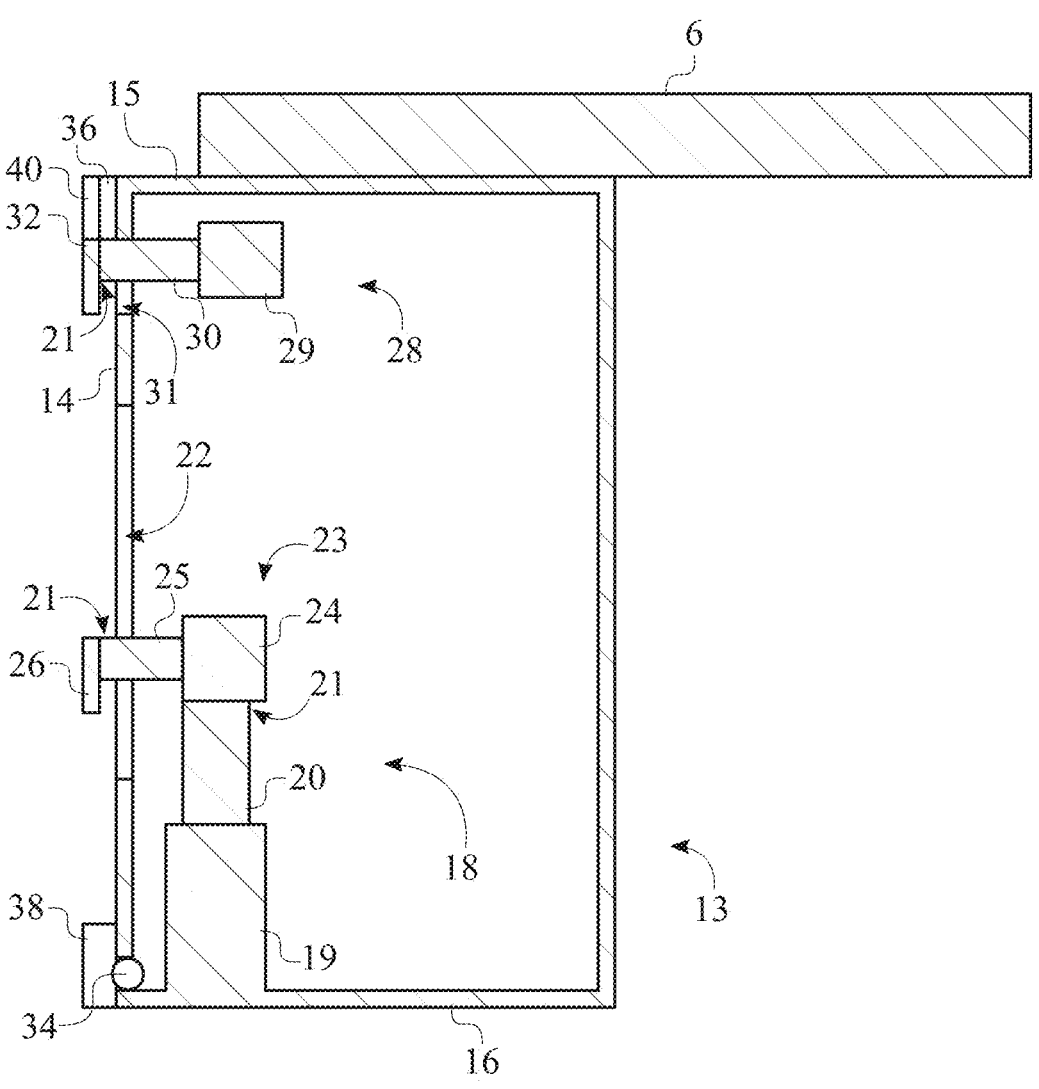
FIG. 21 is a cross-sectional view of the elevator of the present invention showing the second jacking system and the second locking system along line 21-21 of FIG. 19.

In reference to FIG. 18, FIG. 20, and FIG. 21, the present invention may further comprise at least one first roller 33 and at least one second roller 34. The first roller 33 and the second roller 34 are preferably low-friction bearings. The first roller 33 is mounted to the rear panel 14 of the enclosure 13 and adjacently positioned to the first tower rail 1. The second roller 34 is mounted to the rear panel 14 of the enclosure 13 and adjacently positioned to the second tower rail 2. As a result, the first roller 33 is able to reduce friction between the elevator 5 and first tower rail 1 and the second roller 34 is able to reduce friction between the elevator 5 and the second tower rail 2 during the upward or downward movement of the elevator 5.

In reference to FIG. 18, FIG. 20, and FIG. 21, the present invention may further comprise a first upper-tension plate 35 and a second upper-tension plate 36 that function as upper guide plates. More specifically, the first upper-tension plate 35 is externally connected to the enclosure 13 and positioned adjacent to the top panel 15 of the enclosure 13. The second upper-tension plate 36 is externally connected to the enclosure 13 and positioned adjacent to the top panel 15, opposite of the first upper-tension plate 35. Furthermore, the first upper-tension plate 35 is slidably engaged with the first tower rail 1, and the second upper-tension plate 36 is slidably engaged with the second tower rail 2 in order to guide the elevator 5 along the first tower rail 1 and the second tower rail 2 to prevent lateral movement of the elevator 5 during the upward or downward movements.

In reference to FIG. 18, FIG. 20, FIG. 21, and FIG. 32, the present invention may further comprise a first upper-guide plate 39 and a second upper-guide plate 40. The first upper-guide plate 39 forms an angle with the first upper-tension plate 35 and is used to support the elevator 5 against the first tower rail 1. Moreover, the first upper-guide plate 39 is connected perpendicular to the first upper-tension plate 35 and is positioned offset from the top panel 15 of the enclosure 13. Thus, the first upper-guide plate 39 is able to effectively engage with an elevator rail overhang of the first tower rail 1, which is shown in FIG. 18. The first upper-tension plate 35 and the first upper-guide plate 39 may be configured as a single functional component (i.e., a "first upper-guide plate with tension strap"). Similarly, the second upper-guide plate 40 forms an angle with the second upper-tension plate 36 and is used to support the elevator 5 against the second tower rail 2. Moreover, the second upper-guide plate 40 is connected perpendicular to the second upper-tension plate 36 and is positioned offset from the top panel 15 of the enclosure 13. Thus, the second upper-guide plate 40 is able to effectively engage with an elevator rail overhang of the second tower rail 2 (i.e., this elevator rail overhang is oriented opposite to the elevator rail overhang of the first rail tower 1), which is also shown in FIG. 18. The second upper-tension plate 36 and the second upper-guide plate 40 may be configured as a single functional component (i.e., a "second upper-guide plate with tension strap"). Furthermore, the first upper-guide plate 39 and the second upper-guide plate 40 are oriented towards each other, which allows the elevator 5 to be further supported against the first tower rail 1 and the second tower rail 2 as the elevator 5 is able to slide up and down the first tower rail 1 and the second tower rail 2.

In reference to FIG. 18, FIG. 20, FIG. 21, the present invention may further comprise a first lower-guide plate 37 and a second lower-guide plate 38 that function as lower guide plates. More specifically, the first lower-guide plate 37 is externally connected to the enclosure 13 and positioned adjacent to the bottom panel 16 of the enclosure 13. The second lower-guide plate 38 is externally connected to the enclosure 13 and positioned adjacent to the bottom panel 16, opposite of the first lower-guide plate 37. Furthermore, the first lower-guide plate 37 is slidably engaged with the first tower rail 1, and the second lower-guide plate 38 is slidably engaged with the second tower rail 2 in order to guide the elevator 5 along the first tower rail 1 and the second tower rail 2 to prevent lateral movement of the elevator 5 during the upward or downward movements.

Figure 26:
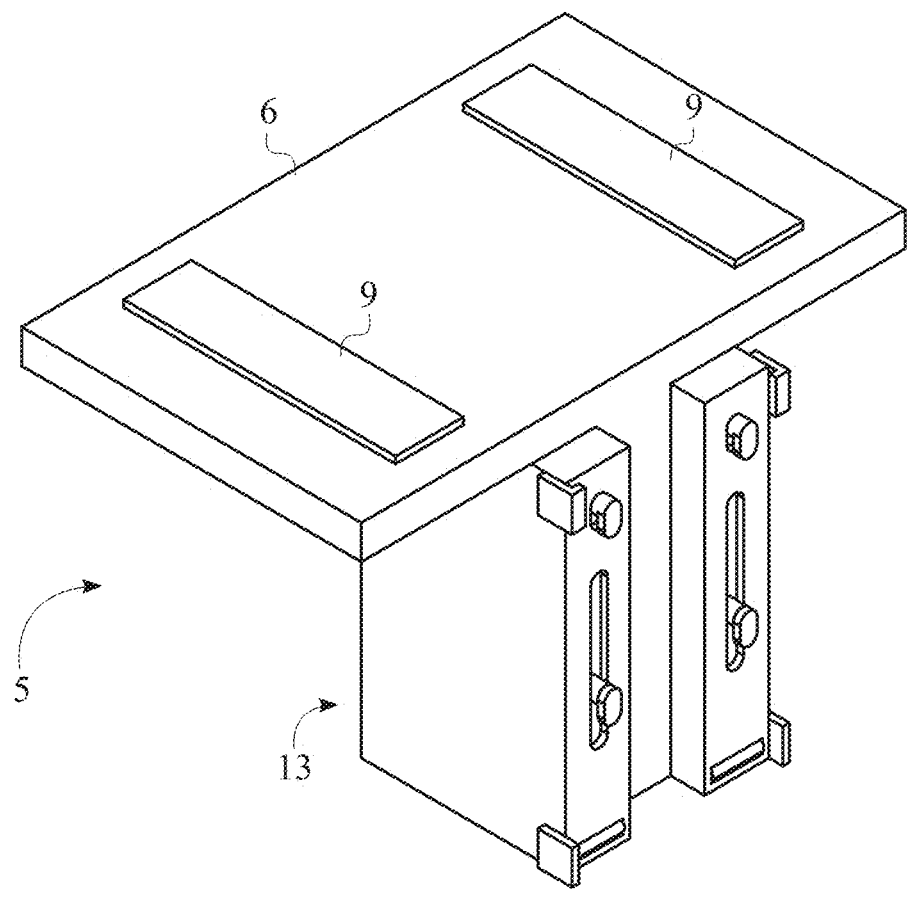
FIG. 26 is a top perspective view of the elevator showing the conveyor system.

In reference to FIG. 26, some embodiments of the present invention can comprise at least one conveyor system 9 to case and control the lateral movement of the lifted or lower items. More specifically, the conveyor system 9 is connected onto the main platform 6 as the conveyor system 9 and the enclosure 13 are oppositely positioned of each other about the main platform 6. The conveyor system 9 can be any industry standard mechanical handling equipment that is capable of moving the nacelle, the blades, and other wind turbine related apparatus. For example, the nacelle can be loaded and secured to the conveyor system 9 so that the nacelle can be lifted to the top end of the wind turbine tower. Then, the nacelle can be guided onto the top end of the wind turbine tower via the operation of the conveyor system 9.

In reference to FIG. 27, some embodiments of the present invention can comprise a single-blade grasping system 10 and a platform setting 41 to lift or lower a single turbine blade. More specifically, the platform setting 41 is slidably mounted onto the main platform 6 through the conveyor system 9, and the single-blade grasping system 10 is hingedly mounted onto the platform setting 41, which allows the single-blade grasping system 10 to be configured to secure a turbine blade. For example, the turbine blade can be loaded and secured to the single-blade grasping system 10 so that the turbine blade can be lifted to the top end of the wind turbine tower. Then, the turbine blade can be guided to the nacelle via the operation of the conveyor system 9 so that the turbine blade can be mounted.

In reference to FIG. 28, some other embodiments of the present invention can comprise a double-blade grasping system 11 and a hinged setting 42 to lift or lower multiple turbine blades. The hinged setting 42 is slidably mounted onto the main platform 6 through the conveyor system 9, and a hinge axis of the hinged setting 42 is positioned adjacent to a front end 7 of the main platform 6 (i.e., the front end 7 and a rear panel 14 of the enclosure 13 are positioned opposite to each other about the elevator 5). Moreover, the double-blade grasping system 11 is hingedly mounted onto the hinged setting 42, offset from the conveyor system 9, which allows the double-blade grasping system 11 to be configured to secure a turbine-blades assembly. For example, the turbine-blades assembly can be loaded and secured to the double-blade grasping system 11 so that the turbine-blades assembly can be lifted to the top end of the wind turbine tower. It is preferred that at least two blades from the turbine-blades assembly are secured to the double-blade grasping system 11, and the turbine-blades assembly is oriented parallel to the ground surface. Then, the turbine-blades assembly can be lifted to the nacelle and rotated 90 degrees toward the nacelle via the operation of the double-blade grasping system 11 to mount the turbine-blades assembly to the nacelle.

Figure 29:
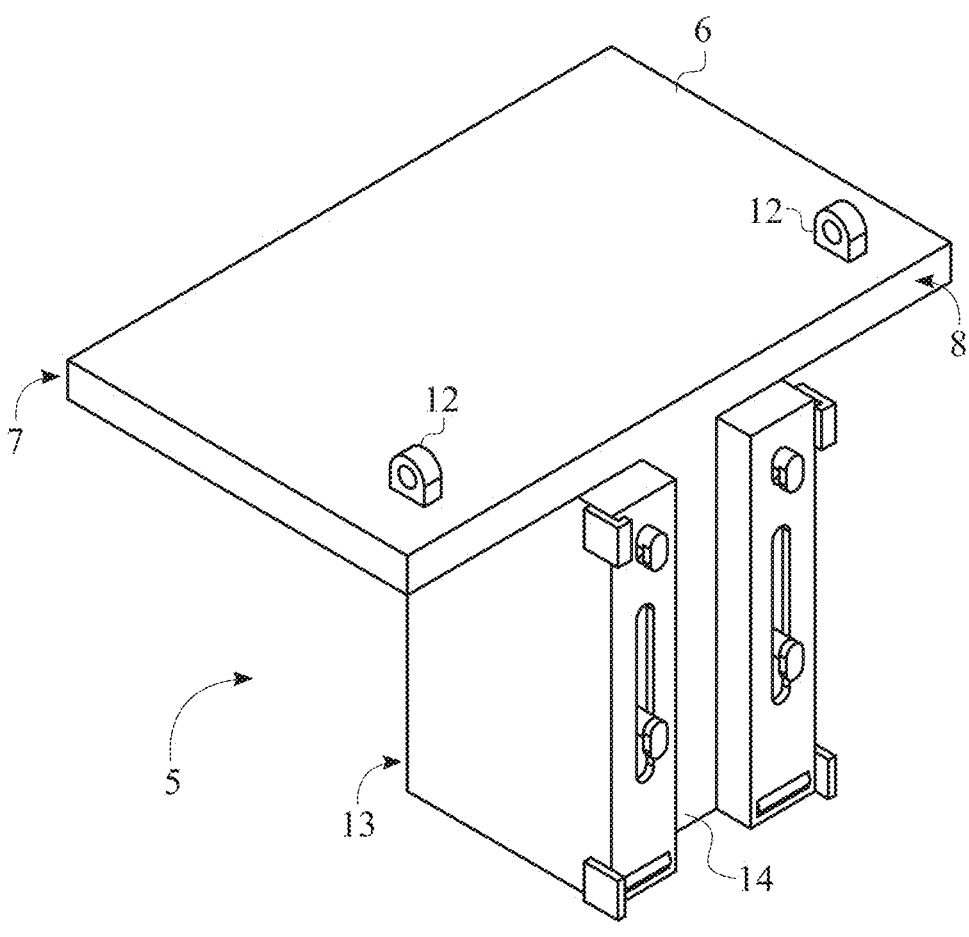
FIG. 29 is a top perspective view of the elevator showing the nacelle support system.

In reference to FIG. 29, some embodiments of the present invention can comprise a nacelle support system 12 that is configured to secure and lift a nacelle or an assembly of nacelle and turbine blades. More specifically, the nacelle support system 12 is hingedly connected onto a rear end 8 of the main platform 6 as the rear end 8 and the rear panel 14 are positioned adjacent to each other. For example, a nacelle or an assembly of nacelle and turbine blades can be loaded and secured to the nacelle support system 12 so that the loaded component can be lifted to the top end of the wind turbine tower. It is preferred that the nacelle is secured upright as the rotor of the nacelle is oriented upward. Then, the loaded component can be lifted to the top end of the wind turbine tower and rotated 90 degrees toward the wind turbine tower via the operation of the nacelle support system 12 to place and mount the nacelle to the top end of the wind turbine tower.

Although the invention has been explained in relation to its preferred embodiment, it is to be understood that many other possible modifications and variations can be made without departing from the spirit and scope of the invention as hereinafter claimed.

What is claimed is:

1. A wind turbine tower elevator with tower belt comprising:

a first tower rail;
a second tower rail;
an elevator;
a first jacking system;
a second jacking system;
a first locking system;
a second locking system;
a multi-section belt;
a plurality of top rollers;
a plurality of bottom rollers;
the elevator comprising a main platform and an enclosure;
the multi-section belt comprising a first belt end, a second belt end, a top annular belt face, and a bottom annular belt face;
the first tower rail and the second tower rail being mounted parallel and offset to each other;

the main platform being connected onto the enclosure;
the main platform and the enclosure being positioned adjacent to the first tower rail and the second tower rail;
the first jacking system, the second jacking system, the first locking system, and the second locking system being integrated into the enclosure;
the enclosure being slidably mounted to the first tower rail by the first jacking system and the first locking system;
the enclosure being slidably mounted to the second tower rail by the second jacking system and the second locking system;
the first belt end and the second belt end being positioned adjacent to the main platform;
the first belt end being laterally connected to the enclosure;
the second belt end being laterally connected to the enclosure, opposite the first belt end;
the top annular belt face being oriented towards the main platform;
the bottom annular belt face being oriented away from the main platform;
the plurality of top rollers being distributed about the top annular belt face;
each of the plurality of top rollers being mounted onto the top annular belt face;
the plurality of bottom rollers being distributed about the bottom annular belt face; and
each of the plurality of bottom rollers being mounted onto the bottom annular belt face.

2. The wind turbine tower elevator with tower belt as claimed in claim 1 comprising:

the multi-section belt further comprising a half belt section, a first quarter belt section, and a second quarter belt section;
the first belt end being terminally coincident with the first quarter belt section;
the second belt end being terminally coincident with the second quarter belt section;
the first quarter belt section being connected between the first belt end and the half belt section;
the second quarter belt section being connected between the second belt end and the half belt section; and
the half belt section being connected between the first quarter belt section and the second quarter belt section.

3. The wind turbine tower elevator with tower belt as claimed in claim 1 comprising:

a safety rail; and
the safety rail being perimetrically connected around the top annular belt face.

4. The wind turbine tower elevator with tower belt as claimed in claim 1 comprising:

the first tower rail and the second tower rail each comprising a rail body and a plurality of jacking slots;
the rail body of the first tower rail and the rail body of the second tower rail being mounted parallel and offset to each other;
the plurality of jacking slots traversing into the rail body; and
the plurality of jacking slots being evenly distributed along the rail body.

5. The wind turbine tower elevator with tower belt as claimed in claim 1 comprising:

the enclosure comprising a rear panel;
the main platform being positioned perpendicular to the rear panel; and
the rear panel being positioned adjacent to the first tower rail and the second tower rail.

6. The wind turbine tower elevator with tower belt as claimed in claim 1 comprising:

the first jacking system and the second jacking system each comprising a lower jack body, a vertical piston rod, an elongated slot, and a lower locking assembly;

the lower locking assembly comprising a jack housing, a horizontal shaft, and a lower locking body;

the lower jack body being mounted within the enclosure;

the vertical piston rod being operatively coupled to the lower jack body, wherein the lower jack body actuates the linear movement of the vertical piston rod;

the elongated slot traversing through a rear panel of the enclosure;

the elongated slot being linearly extended in between a top panel of the enclosure and the bottom panel;

the elongated slot being positioned parallel to the vertical piston rod;

the jack housing being connected to a free end of the vertical piston rod;

the horizontal shaft being operatively coupled to the jack housing, wherein the jack housing actuates the lateral movement of the horizontal shaft;

the horizontal shaft being slidably positioned along the elongated slot; and the lower locking body being connected to a free end of the horizontal shaft.

7. The wind turbine tower elevator with tower belt as claimed in claim 6 comprising:

the first tower rail and the second tower rail each comprising a plurality of jacking slots;

the lower locking body of the first jacking system being concentrically engaged within a lower arbitrary slot of the plurality of jacking slots of the first tower rail; and the lower locking body of the second jacking system being concentrically engaged within a lower corresponding slot of the plurality of jacking slots of the second tower rail, wherein the lower corresponding slot is positioned opposite of the lower arbitrary slot.

8. The wind turbine tower elevator with tower belt as claimed in claim 1 comprising:

the first locking system and the second locking system each comprising an upper jack body, a horizontal piston rod, a locking channel, and an upper locking body;

the upper jack body being mounted within the enclosure;

the horizontal piston rod being operatively coupled to the upper jack body, wherein the upper jack body actuates the linear movement of the horizontal piston rod;

the locking channel traversing through a rear panel of the enclosure;

the locking channel being positioned adjacent to a top panel of the enclosure;

the horizontal piston rod being slidably positioned within the locking channel; and the upper locking body being connected to a free end of the horizontal piston rod.

9. The wind turbine tower elevator with tower belt as claimed in claim 8 comprising:

the first tower rail and the second tower rail each comprising a plurality of jacking slots;

the upper locking body of the first locking system being concentrically engaged within an upper arbitrary slot of the plurality of jacking slots of the first tower rail; and the upper locking body of the second locking system being concentrically engaged within an upper corresponding slot of the plurality of jacking slots of the second tower rail, wherein the upper corresponding slot is positioned opposite of the upper arbitrary slot.

10. The wind turbine tower elevator with tower belt as claimed in claim 1 comprising:

at least one first roller;

at least one second roller;

the first roller being mounted to a rear panel of the enclosure;

the second roller being mounted the rear panel of the enclosure;

the first roller being adjacently positioned to the first tower rail; and the second roller being adjacently positioned to the second tower rail.

11. The wind turbine tower elevator with tower belt as claimed in claim 1 comprising:

a first upper-guide plate;

a second upper-guide plate;

the first upper-guide plate being externally connected to the enclosure;

the first upper-guide plate being positioned adjacent to a top panel of the enclosure;

the second upper-guide plate being externally connected to the enclosure, opposite of the first upper-guide plate;

the second upper-guide plate being positioned adjacent to the top panel;

the first upper-guide plate being slidably engaged with the first tower rail; and the second upper-guide plate being slidably engaged with the second tower rail.

12. The wind turbine tower elevator with tower belt as claimed in claim 1 comprising:

a first lower-guide plate;

a second lower-guide plate;

the first lower-guide plate being externally connected to the enclosure;

the first lower-guide plate being positioned adjacent to a bottom panel of the enclosure;

the second lower-guide plate being externally connected to the enclosure, opposite of the first lower-guide plate;

the second lower-guide plate being positioned adjacent to the bottom panel;

the first lower-guide plate being slidably engaged with the first tower rail; and the second lower-guide plate being slidably engaged with the second tower rail.

13. The wind turbine tower elevator with tower belt as claimed in claim 1 comprising:

at least one conveyor system;

the conveyor system being connected onto the main platform; and the conveyor system and the enclosure being oppositely positioned of each other about the main platform.

14. The wind turbine tower elevator with tower belt as claimed in claim 13 comprising:

a single-blade support system; and the single-blade support system being slidably connected onto the main platform through the conveyor system.

15. The wind turbine tower elevator with tower belt as claimed in claim 1 comprising:

a double-blade support system;

the double-blade support system being hingedly connected onto a front end of the main platform; and the front end and a rear panel of the enclosure being oppositely positioned of each other.

16. The wind turbine tower elevator with tower belt as claimed in claim 1 comprising:

a nacelle support system;

the nacelle support system being hingedly connected onto a rear end of the main platform; and the rear end and a rear panel of the enclosure being positioned adjacent to each other.

* * * * *